US012231183B2

(12) United States Patent
Bai et al.

(10) Patent No.: US 12,231,183 B2
(45) Date of Patent: Feb. 18, 2025

(54) MACHINE LEARNING FOR BEAM PREDICTIONS WITH CONFIDENCE INDICATIONS

(71) Applicant: QUALCOMM Incorporated, San Diego, CA (US)

(72) Inventors: Tianyang Bai, Somerville, NJ (US); Hua Wang, Basking Ridge, NJ (US); Taesang Yoo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 329 days.

(21) Appl. No.: 17/661,543

(22) Filed: Apr. 29, 2022

(65) Prior Publication Data

US 2023/0353264 A1    Nov. 2, 2023

(51) Int. Cl.
*H04B 17/373*    (2015.01)
*G06N 3/08*    (2023.01)
(Continued)

(52) U.S. Cl.
CPC ............. *H04B 17/373* (2015.01); *G06N 3/08* (2013.01); *H04B 17/318* (2015.01); *H04W 24/08* (2013.01)

(58) Field of Classification Search
None
See application file for complete search history.

(56) References Cited

U.S. PATENT DOCUMENTS 5,898,792 A  *  4/1999  Oste .................... G01N 21/85
                                                   382/110
6,234,010 B1 *  5/2001  Zavarehi ............. G01M 15/11
                                                   73/114.25
(Continued)

FOREIGN PATENT DOCUMENTS

CN          114024946 A  *  2/2022  ........... H04B 17/327

OTHER PUBLICATIONS

Bertil Grelsson, "Improved Learning in Convolutional Neural Networks with Shifted Exponential Linear Units", 24th International Conference on Pattern Recognition (ICPR), Beijing, China, Aug. 20-24, 2018 (Year: 2018).*

(Continued)

*Primary Examiner* — Gennadiy Tsvey
(74) *Attorney, Agent, or Firm* — Harrity & Harrity, LLP

(57) ABSTRACT

Various aspects of the present disclosure generally relate to wireless communication. In some aspects, a user equipment (UE) may receive a signal. The UE may determine, based at least in part on a machine learning component, a predicted communication metric and a confidence indication, the machine learning component comprising a machine learning model, and wherein determining the predicted communication metric and the confidence indication comprises: receiving, by the machine learning model, an input that comprises an input metric and an error measurement corresponding to the input metric; and providing, by the machine learning model, and based at least in part on a machine learning function and the input, the predicted communication metric and the confidence indication. The UE may perform a wireless communication task based at least in part on the predicted communication metric and the confidence indication. Numerous other aspects are described.

30 Claims, 10 Drawing Sheets

(51) Int. Cl.
   *H04B 17/318*      (2015.01)
   *H04W 24/08*       (2009.01)

(56) References Cited

U.S. PATENT DOCUMENTS

| | | | | |
|---|---|---|---|---|
| 11,188,917 | B2* | 11/2021 | Saleh | G06F 21/316 |
| 2004/0049353 | A1* | 3/2004 | Ezratty | G01N 33/5014 |
| | | | | 703/11 |
| 2011/0046825 | A1* | 2/2011 | Lastere | G05B 23/0254 |
| | | | | 701/16 |
| 2011/0190912 | A1* | 8/2011 | Paul | G16Z 99/00 |
| | | | | 700/93 |
| 2012/0054131 | A1* | 3/2012 | Williamson | G06N 20/00 |
| | | | | 706/12 |
| 2017/0232294 | A1* | 8/2017 | Kruger | G09B 19/003 |
| | | | | 434/247 |
| 2018/0189466 | A1* | 7/2018 | Raviv | G06N 3/045 |
| 2019/0228330 | A1* | 7/2019 | Kaifosh | G06F 3/014 |
| 2019/0238202 | A1* | 8/2019 | Chavva | H04B 7/0617 |
| 2020/0074280 | A1* | 3/2020 | Meier | G06N 3/084 |
| 2020/0097841 | A1* | 3/2020 | Petousis | H03M 7/6023 |
| 2020/0201443 | A1* | 6/2020 | Huang | G06N 20/20 |
| 2020/0209858 | A1* | 7/2020 | Trofymov | G06N 3/084 |
| 2020/0259575 | A1 | 8/2020 | Bai et al. | |
| 2020/0366340 | A1* | 11/2020 | Zhang | H04B 17/318 |
| 2021/0034335 | A1* | 2/2021 | Svyatkovskiy | G06N 3/088 |
| 2021/0153738 | A1* | 5/2021 | Jia | A61B 3/1233 |
| 2021/0163313 | A1* | 6/2021 | Arndt | C02F 3/006 |
| 2021/0167875 | A1* | 6/2021 | Shen | H04B 17/327 |
| 2021/0243073 | A1* | 8/2021 | Pezeshki | H04L 41/16 |
| 2021/0329267 | A1* | 10/2021 | Kianfar | G06N 3/047 |
| 2021/0351885 | A1* | 11/2021 | Chavva | G06N 3/08 |
| 2021/0385682 | A1* | 12/2021 | Bedekar | G06N 3/105 |
| 2021/0390456 | A1* | 12/2021 | Pickerd | G01R 31/31708 |
| 2022/0125328 | A1* | 4/2022 | Eguchi | A61B 5/0816 |
| 2022/0138571 | A1* | 5/2022 | Shepstone | G06N 3/045 |
| | | | | 706/21 |
| 2022/0190883 | A1* | 6/2022 | Kaya | H04W 36/08 |
| 2022/0215956 | A1* | 7/2022 | Kong | G06T 7/0012 |
| 2022/0253678 | A1* | 8/2022 | Han | G06F 18/214 |
| 2022/0271851 | A1* | 8/2022 | Prasad | H04B 7/0652 |
| 2022/0294666 | A1* | 9/2022 | Jeon | H04L 25/0254 |
| 2022/0295295 | A1* | 9/2022 | Moosavi | H04W 24/08 |
| 2022/0312357 | A1* | 9/2022 | Prasad | H04B 17/3913 |
| 2022/0321647 | A1* | 10/2022 | Berggren | H04L 67/10 |
| 2022/0335337 | A1* | 10/2022 | Kovács | H04W 4/50 |
| 2023/0004864 | A1* | 1/2023 | Wang | G06N 20/00 |
| 2023/0010095 | A1* | 1/2023 | Alabbasi | H04L 41/145 |
| 2023/0025432 | A1* | 1/2023 | Da Silva | H04W 64/006 |
| 2023/0044727 | A1* | 2/2023 | Pantelidou | G06N 5/04 |
| 2023/0099006 | A1* | 3/2023 | Popescu | G06N 20/20 |
| | | | | 370/252 |
| 2023/0141060 | A1* | 5/2023 | Elkhomri | E21B 43/00 |
| | | | | 166/250.01 |

OTHER PUBLICATIONS

International Search Report and Written Opinion—PCT/US2023/019790—ISA/EPO—Oct. 2, 2023.
Partial International Search Report—PCT/US2023/019790—ISA/EPO—Aug. 10, 2023.

* cited by examiner

MACHINE LEARNING FOR BEAM PREDICTIONS WITH CONFIDENCE INDICATIONS

FIELD OF THE DISCLOSURE

Aspects of the present disclosure generally relate to wireless communication and to techniques and apparatuses for machine learning for beam predictions with confidence indications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a signal. The method may include determining, based at least in part on a machine learning component, a predicted communication metric and a confidence indication, the machine learning component comprising a machine learning model, and wherein determining the predicted communication metric and the confidence indication comprises, receiving, by the machine learning model, an input that comprises an input metric and an error measurement corresponding to the input metric; and providing, by the machine learning model, and based at least in part on a machine learning function and the input, the predicted communication metric and the confidence indication. The method may include performing a wireless communication task based at least in part on the predicted communication metric and the confidence indication.

Some aspects described herein relate to a method of wireless communication performed by a network node. The method may include transmitting a machine learning configuration associated with a machine learning component configured to generate, a predicted communication metric and a confidence indication, the machine learning component comprising a machine learning model configured, obtain, by the machine learning model, an input that comprises an input metric and an error measurement corresponding to the input metric providing, by the machine learning model, and based at least in part on a machine learning function and the input, the predicted communication metric and the confidence indication. The method may include transmitting a reference signal.

Some aspects described herein relate to a UE for wireless communication. The user equipment may include a memory and one or more processors coupled to the memory. The one or more processors may be configured to receive a signal. The one or more processors may be configured to determine, based at least in part on a machine learning component, a predicted communication metric and a confidence indication, the machine learning component comprising a machine learning model, and wherein, to determine the predicted communication metric and the confidence indication, the one or more processors are configured. The one or more processors may be configured to perform a wireless communication task based at least in part on the predicted communication metric and the confidence indication.

Some aspects described herein relate to a network node for wireless communication. The network node may include a memory and one or more processors coupled to the memory. The one or more processors may be configured to transmit a machine learning configuration associated with a machine learning component configured to generate, a predicted communication metric and a confidence indication, the machine learning component comprising a machine learning model configured to obtain, by the machine learning model, an input that comprises an input metric and an error measurement corresponding to the input metric; and provide, by the machine learning model, and based at least in part on a machine learning function and the input, the predicted communication metric and the confidence indication. The one or more processors may be configured to transmit a reference signal.

Some aspects described herein relate to a non-transitory computer-readable medium that stores a set of instructions for wireless communication by a UE. The set of instructions, when executed by one or more processors of the UE, may cause the UE to receive a signal. The set of instructions, when executed by one or more processors of the UE, may cause the UE to determine, based at least in part on a machine learning component, a predicted communication metric and a confidence indication, the machine learning component comprising a machine learning model, and wherein, to determine the predicted communication metric and the confidence indication, the one or more instructions are configured to cause the UE to obtain, by the machine learning model, an input that comprises an input metric and an error measurement corresponding to the input metric; and provide, by the machine learning model, and based at least in part on a machine learning function and the input, the predicted communication metric and the confidence indication. The set of instructions, when executed by one or more processors of the UE, may cause the UE to perform a wireless communication task based at least in part on the predicted communication metric and the confidence indication.

Some aspects described herein relate to a non-transitory computer-readable medium that stores a set of instructions for wireless communication by a network node. The set of instructions, when executed by one or more processors of the network node, may cause the network node to transmit a machine learning configuration associated with a machine learning component configured to generate, a predicted communication metric and a confidence indication, the machine learning component comprising a machine learning model configured to obtain, by the machine learning model, an input that comprises an input metric and an error measurement corresponding to the input metric; and provide, by the machine learning model, and based at least in part on a machine learning function and the input, the predicted communication metric and the confidence indication. The set of instructions, when executed by one or more processors of the network node, may cause the network node to transmit a reference signal.

Some aspects described herein relate to an apparatus for wireless communication. The apparatus may include means for receiving a signal. The apparatus may include means for determining, based at least in part on a machine learning component, a predicted communication metric and a confidence indication, the machine learning component comprising a machine learning model, and wherein the means for determining the predicted communication metric and the confidence indication comprises, means for receiving an input that comprises an input metric and an error measurement corresponding to the input metric means for providing and based at least in part on a machine learning function and the input, the predicted communication metric and the confidence indication. The apparatus may include means for performing a wireless communication task based at least in part on the predicted communication metric and the confidence indication.

Some aspects described herein relate to an apparatus for wireless communication. The apparatus may include means for transmitting a machine learning configuration associated with a machine learning component configured to generate, a predicted communication metric and a confidence indication, the machine learning component comprising a machine learning model comprising, means for obtaining an input that comprises an input metric and an error measurement corresponding to the input metric means for providing and based at least in part on a machine learning function and the input, the predicted communication metric and the confidence indication. The apparatus may include means for transmitting a reference signal.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
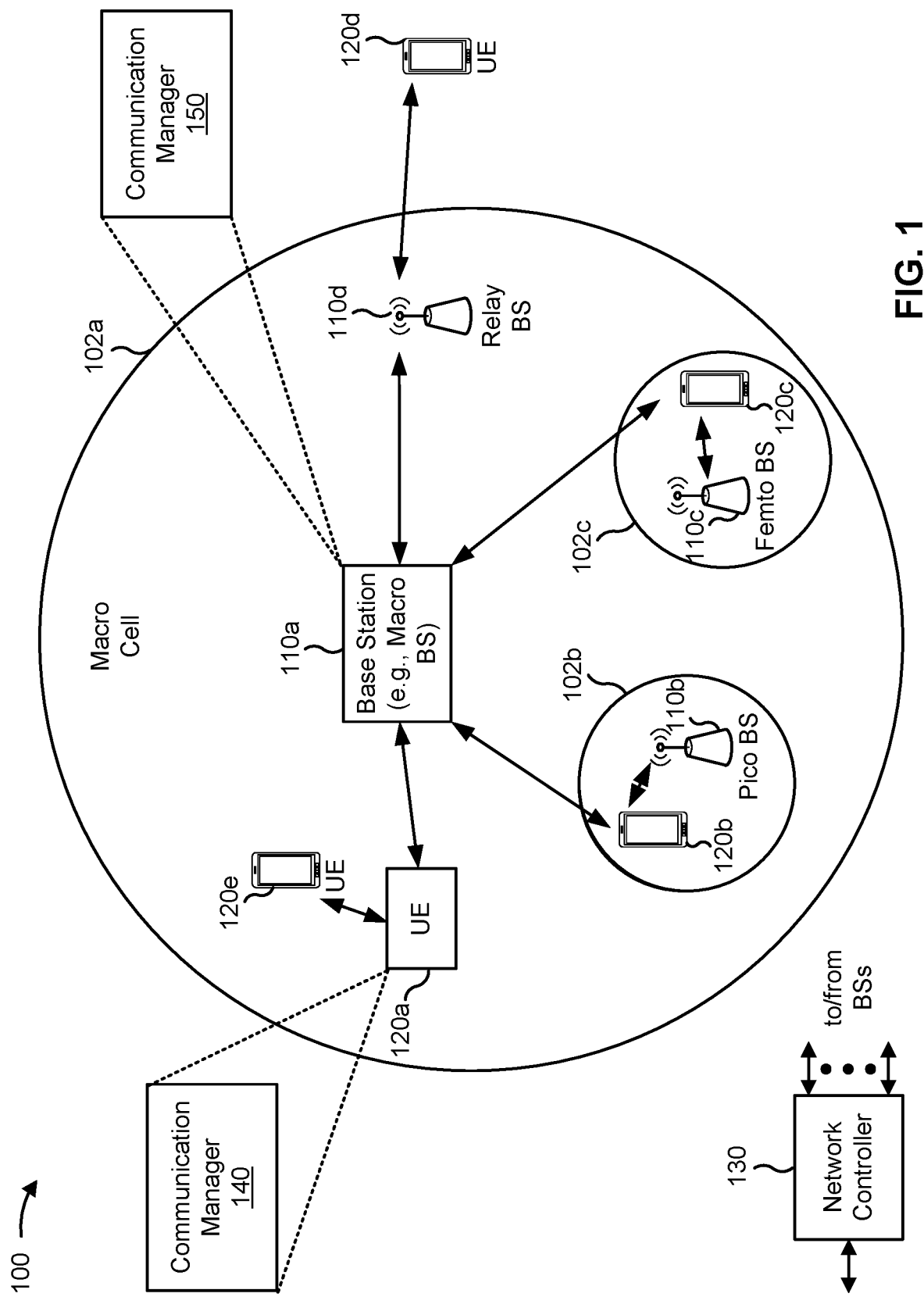
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE 120 may include a communication manager 140. As described in more detail elsewhere herein, the communication manager 140 may receive a signal; determine, based at least in part on a machine learning component, a predicted communication metric and a confidence indication, the machine learning component comprising a machine learning model, and wherein determining the predicted communication metric and the confidence indication comprises: receive an input that comprises an input metric and an error measurement corresponding to the input metric; and provide and based at least in part on a machine learning function and the input, the predicted communication metric and the confidence indication; and perform a wireless communication task based at least in part on the predicted communication metric and the confidence indication. Additionally, or alternatively, the communication manager 140 may perform one or more other operations described herein.

In some aspects, a network node may include a communication manager 140 or a communication manager 150. As described in more detail elsewhere herein, the communication manager 140 or 150 may transmit a machine learning configuration associated with a machine learning component configured to generate, a predicted communication metric and a confidence indication, the machine learning component comprising a machine learning model configured to: obtain an input that comprises an input metric and an error measurement corresponding to the input metric; and provide and based at least in part on a machine learning function and the input, the predicted communication metric and the confidence indication; and transmit a reference signal. Additionally, or alternatively, the communication manager 140 or 150 may perform one or more other operations described herein.

As indicated above, FIG. 1 is provided as an example. Other examples may differ from what is described with regard to FIG. 1.

Figure 2:
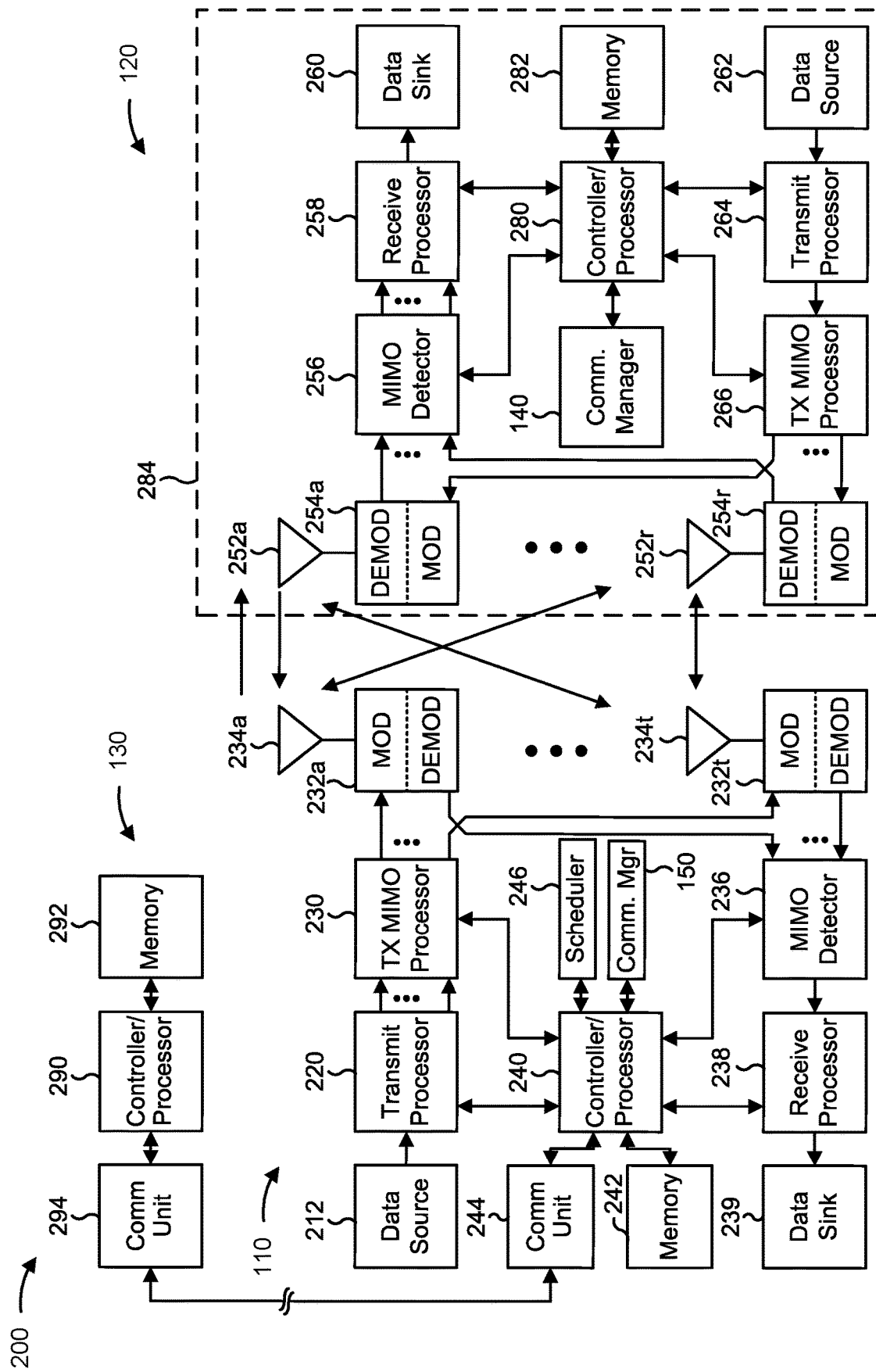
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-10).

The controller/processor 240 of the base station 110, the controller/processor 280 of the UE 120, and/or any other component(s) of FIG. 2 may perform one or more techniques associated with machine learning for beam predictions with confidence indications, as described in more detail elsewhere herein. In some aspects, the network node described herein is the base station 110, is included in the base station 110, or includes one or more components of the base station 110 shown in FIG. 2. In some aspects, the network node described herein is the UE 120, is included in the UE 120, or includes one or more components of the UE 120 shown in FIG. 2. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, a UE includes means for receiving a signal; means for determining, based at least in part on a machine learning component, a predicted communication metric and a confidence indication, the machine learning component comprising a machine learning model, and wherein determining the predicted communication metric and the confidence indication comprises: means for receiving, by the machine learning model, an input that comprises an input metric and an error measurement corresponding to the input metric; and/or means for providing, by the machine learning model, and based at least in part on a machine learning function and the input, the predicted communication metric and the confidence indication; and/or means for performing a wireless communication task based at least in part on the predicted communication metric and the confidence indication. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node includes means for transmitting a machine learning configuration associated with a machine learning component configured to generate, a predicted communication metric and a confidence indication, the machine learning component comprising a machine learning model configured to: means for obtain, by the machine learning model, an input that comprises an input metric and an error measurement corresponding to the input metric; and/or means for provide, by the machine learning model, and based at least in part on a machine learning function and the input, the predicted communication metric and the confidence indication; and/or means for transmitting a reference signal. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the network node to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
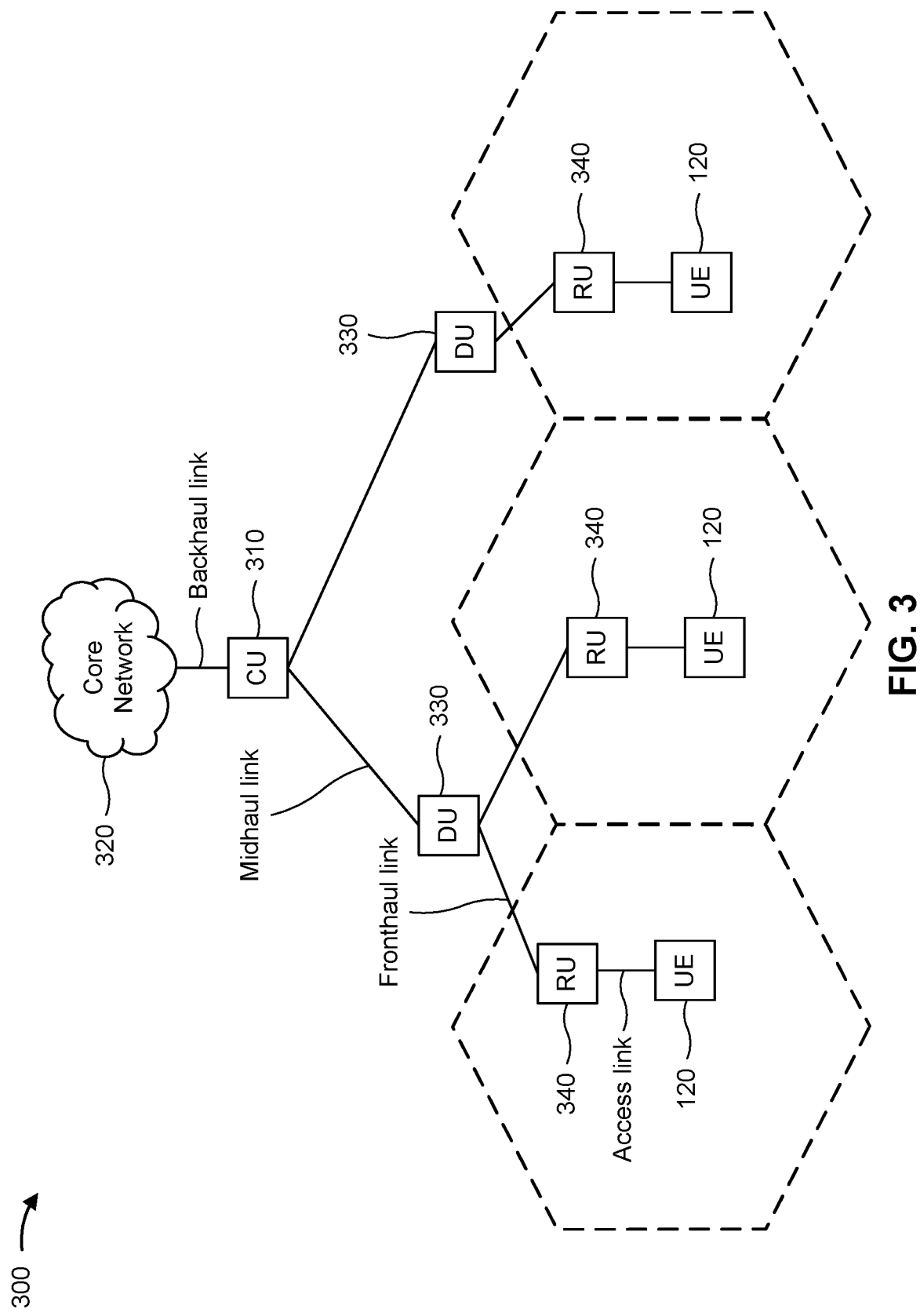
FIG. 3 is a diagram illustrating an example of open radio access network communications, in accordance with the present disclosure.

FIG. 3 is a diagram illustrating an example 300 of an O-RAN architecture, in accordance with the present disclosure. As shown in FIG. 3, the O-RAN architecture may include a control unit (CU) 310 that communicates with a core network 320 via a backhaul link. Furthermore, the CU 310 may communicate with one or more distributed units (DUs) 330 via respective midhaul links. The DUs 330 may each communicate with one or more radio units (RUs) 340 via respective fronthaul links, and the RUs 340 may each communicate with respective UEs 120 via radio frequency (RF) access links. The DUs 330 and the RUs 340 may also be referred to as O-RAN DUs (O-DUs) 330 and O-RAN RUs (O-RUs) 340, respectively.

In some aspects, the DUs 330 and the RUs 340 may be implemented according to a functional split architecture in which functionality of a base station 110 (e.g., an eNB or a gNB) is provided by a DU 330 and one or more RUs 340 that communicate over a fronthaul link. Accordingly, as described herein, a base station 110 may include a DU 330 and one or more RUs 340 that may be co-located or geographically distributed. In some aspects, the DU 330 and the associated RU(s) 340 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 330 may correspond to a logical unit that includes one or more base station functions to control the operation of one or more RUs 340. For example, in some aspects, the DU 330 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 310. The RU(s) 340 controlled by a DU 330 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 340 handle all over the air (OTA) communication with a UE 120, and real-time and non-real-time aspects of control and user plane communication with the RU(s) 340 are controlled by the corresponding DU 330, which enables the DU(s) 330 and the CU 310 to be implemented in a cloud-based RAN architecture.

As indicated above, FIG. 3 is provided as an example. Other examples may differ from what is described with regard to FIG. 3.

Machine learning can be used in wireless communications to facilitate channel estimation, beam selection, beamforming, and/or other procedures in which predicted values can be useful. In some cases, for example, machine learning can be used for beam prediction. In beam prediction, a machine learning component implemented, for example, at a UE can be used to predict a channel metric (e.g., an RSRP) based on a machine learning model that is trained on empirical data (e.g., past values of the metric).

Machine learning based beam prediction can be subject to error. For example, given prior channel metric measurements, a future channel metric value is a random variable and is subject to randomness due to fading and noise, uncertainty of the UE's future location, and/or error due to model limitations. In some cases, therefore, using a single predicted value from a machine learning model as a predictor may result in poor scheduling decisions, leading to scheduling conflicts, inadequate channels, and/or missed communications, thereby having a negative impact on network performance.

Some aspects of the techniques and apparatuses described herein may provide a machine learning component that takes, as input, a measurement error, in addition to channel measurements, and provides, as output, a predicted value and a confidence indication associated with the predicted value. For example, in some aspects, a UE may receive a signal and determine, based at least in part on a machine learning component, a predicted communication metric and a confidence indication. In some aspects, the machine learning component may include a machine learning model. The UE may determine the predicted communication metric and the confidence indication based on receiving, by the machine learning model, an input that comprises an input metric and an error measurement corresponding to the input metric. The UE may provide, by the machine learning model, and based at least in part on a machine learning function and the input, the predicted communication metric and the confidence indication. In some aspects, the UE may perform a wireless communication task based at least in part on the predicted communication metric and the confidence indication.

In this way, some aspects may provide a more accurate machine learning component for beam prediction. For example, in some aspects, the machine learning component may provide a predicted mean communication metric and a standard deviation of the mean with respect to past measurements of the communication metric. In this manner, the standard deviation may provide a confidence level of the predicted mean values. The improved prediction facilitated by some aspects described may result in more efficient scheduling decisions and/or may result in higher quality communications, thereby positively impacting network performance.

Some aspects may include a machine learning model having certain characteristics. For example, to facilitate a standard deviation output, an output layer of the machine learning model may be configured so that the output is always positive. In some aspects, the past measurement pattern and measurement error quality may be used to facilitate determining the predicted standard deviation. In some aspects, the machine learning model also may be configured to receive sparse measurement patterns (e.g., where only a subset of beams are measured). Some aspects may facilitate more reliable beam prediction, proactive rejections of bad prediction, more accurate beam selection, less beam failure, and/or higher throughput among other examples.

Figure 4:
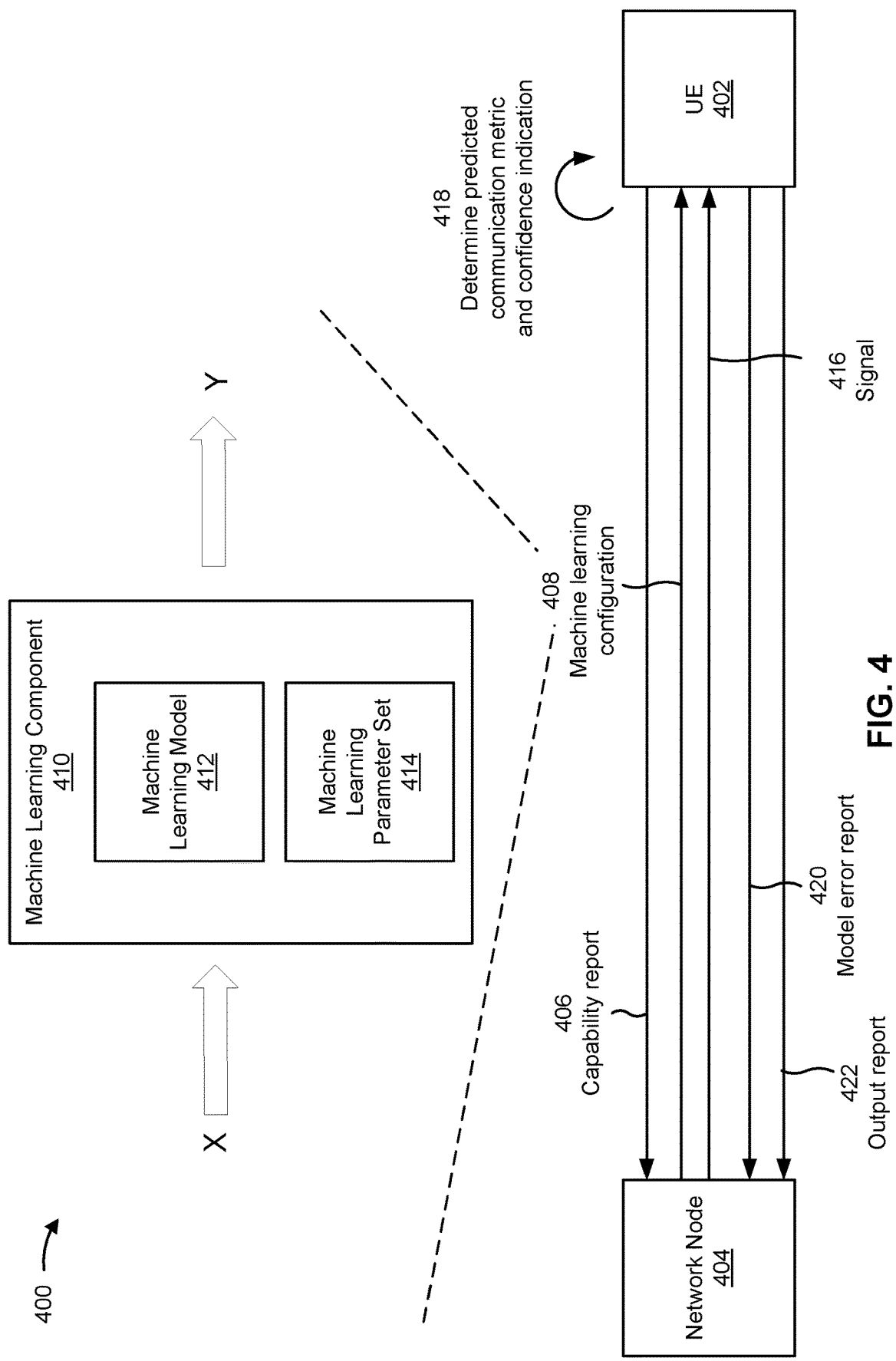
FIGS. 4-6 are diagrams illustrating examples associated with machine learning for beam predictions with confidence indications, in accordance with the present disclosure.

FIG. 4 is a diagram illustrating an example 400 of machine learning for beam predictions with confidence indications, in accordance with the present disclosure. As shown in FIG. 4, a UE 402 and a network node 404 may communicate with one another.

As shown by reference number 406, the UE 402 may transmit, and the network node 404 may receive, a capability report that indicates a capability of the UE 402 to provide a confidence indication. In some aspects, the capability report may further indicate a supported activation type associated with an output layer of a machine learning model implemented at the UE 402.

As shown by reference number 408, the network node 404 may transmit, and the UE 402 may receive, a machine learning configuration associated with a machine learning component. In some aspects, the machine learning configuration may include a machine learning component 410 that includes a machine learning model 412, a set 414 of machine learning parameters, and/or activation indication associated therewith. As shown, the machine learning component 410 may be configured to generate a predicted communication metric, Y, and a confidence indication, C, using the machine learning model 412. The machine learning model 412 may take, as input, an input metric, X, and an error measurement, Ex, corresponding to the input metric X The machine learning model 412 may be configured to use a machine learning function, F(X), to determine the predicted communication metric Y. For example, the machine learning model 412 may be configured to evaluate Y=F(X). In some aspects, the machine learning model 412 may be a neural network function.

In some aspects, the machine learning model may be identified by a machine learning model identifier (ID) such as, for example a neural network function (NNF) ID. In some aspects, each NNF supported by the machine learning component 410 may be identified by a standardized NNF ID. In some aspects, a non-standardized ID may be used to support NNF private extensions. In some aspects, the input metric X and the output metric Y may be standardized. In some aspects, the set 414 of machine learning parameters may be contextual. For example, the set 414 of machine learning parameters may be location and/or configuration specific.

As shown by reference number 416, the network node 404 may transmit, and the UE 402 may receive, a signal. The signal may include a reference signal such as, for example, a synchronization signal block (SSB), and/or a channel state information reference signal (CSI-RS), among other examples. As shown by reference number 418, the UE 402 may determine, based at least in part on the machine learning component 410, a predicted communication metric and a confidence indication. The machine learning component may include a machine learning model, and the UE 402 may determine the predicted communication metric and the confidence indication based on receiving, by the machine learning model, an input that comprises an input metric and an error measurement corresponding to the input metric; and providing, by the machine learning model, and based at least in part on a machine learning function and the input, the predicted communication metric and the confidence indication.

In some aspects, the input metric may include an RSRP, and the predicted communication metric may include a predicted RSRP. The confidence indication comprises a standard deviation associated with the predicted communication metric. In some aspects, the input metric may include an interpolated metric value. The UE 402 may determine a plurality of interpolated metric values that include the interpolated metric value and may select the interpolated metric value based at least in part on the error measurement comprising a smallest error measurement of a plurality of error measurements corresponding to the plurality of interpolated metric values.

As shown by reference number 420, the UE 402 may transmit, and the network node 404 may receive, a model error report that indicates a model inference error associated with the predicted communication metric. In some aspects, transmitting the model error report may include transmitting the model error report based at least in part on at least one analytic metric associated with the predicted communication metric satisfying a reporting condition. As shown by reference number 422, the UE 402 may transmit, and the network node 404 may receive, an output report. The output report may indicate at least one of the predicted communication metric or the confidence indication. In some aspects, the UE 402 may transmit the output report using an over-the-air communication. In some aspects, the output report may include a dedicated uplink control information (UCI) type in a physical layer beam report. In some aspects, the output report may be triggered based at least in part on a confidence indicator satisfying a reporting threshold. In some aspects, reporting a confidence indicator that satisfies a mitigation threshold may cause the network node 404 to trigger additional reference signal transmission and/or reporting in corresponding beam directions.

As indicated above, FIG. 4 is provided as an example. Other examples may differ from what is described with respect to FIG. 4.

Figure 5:
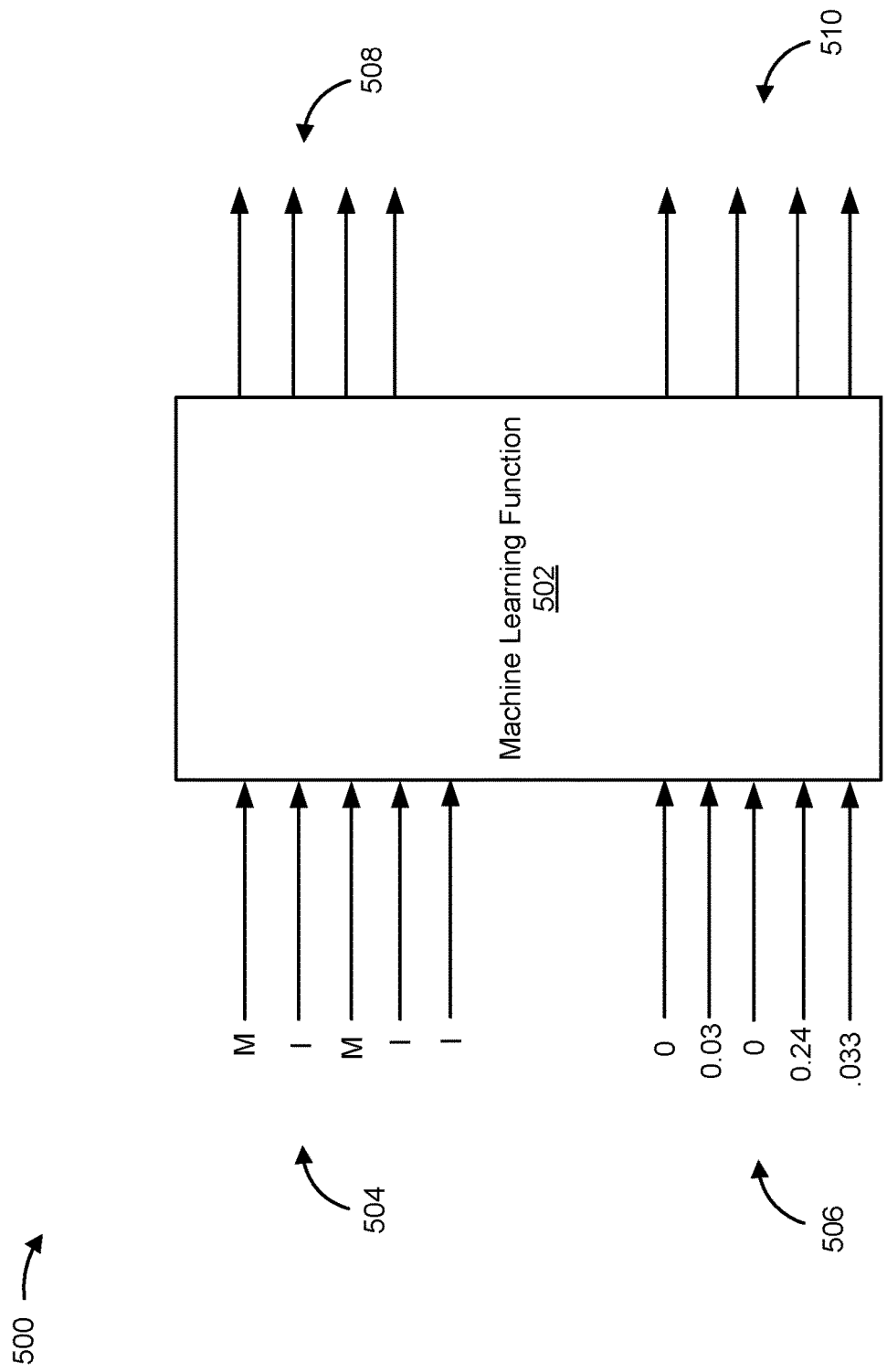

FIG. 5 is a diagram illustrating an example 500 associated with machine learning for beam predictions with confidence indications, in accordance with the present disclosure. Example 500 illustrates a machine learning function 502. The machine learning function 502 may be implemented by the machine learning model 412 depicted in FIG. 4.

As shown, the machine learning function includes a first set 504 of input ports associated with a set of reference signals, a second set 506 of input ports associated with a set of error metrics, a first set 508 of output ports associated with a set of predicted communication metrics, and a second set 510 of output ports associated with a set of confidence measurement outputs. In some aspects, the machine learning function 502 may be configured to perform a pre-processing operation in which the machine learning function normalizing a set of input data based at least in part on a normalization metric.

In some aspects, for example, the machine learning component that implements the machine learning function 502 may obtain a set of measurements associated with a subset of the set of reference signals. The subset may include fewer reference signals than the set of reference signals, and the UE may obtain the set of measurements by skipping at least one configured measurement based at least in part on receiving a downlink communication during a measurement occasion corresponding to the configured measurement. In some aspects, the UE may generate a measurement pattern indication corresponding to the set of measurements, wherein the measurement pattern indication indicates at least one of an input port, of the set 504 of input ports, for which a measurement was not obtained, or an input port, of the set 504 of input ports, for which a measurement was obtained.

In some aspects, the UE may receive a configuration associated with a measurement input format corresponding to the measurement pattern indication. The UE may generate the measurement pattern indication based at least in part on the measurement input format. In some aspects, for example, the UE may generate an interpolated measurement corresponding to a port for which a measurement is not obtained, wherein the measurement pattern indication includes an indication of an interpolation error corresponding to the interpolated measurement.

For example, as shown in FIG. 5, each input port of the set 504 of input ports is labeled with an "M" to represent an input port for which a measurement was obtained or an "I" to represent an input port for which a measurement was not obtained (and, thus, for which an interpolation was generated). Corresponding error values may be provided via the set 506 of input ports. In some aspects, as shown, an error value may be set to "0" for those ports for which a measurement was obtained. In some aspects, rather than provide all of the interpolated measurements and corresponding errors to the machine learning function 502, a selection process may be performed by which one or more interpolations and corresponding errors are selected for providing to the machine learning function 502. For example, one or more interpolations with the smallest error values may be selected for providing to the machine learning function 502.

In some aspects, the UE may provide the predicted communication metric based on performing an autoregression procedure associated with the prior predicted communication metric. For example, in some aspects, there may be no beam measured. In this case, the UE, via the machine learning model, may perform time domain interpolation from previous beam measurements. In some aspects, a predicted communication metric from a prior step can be used as input to predict a communication metric in an next step using autoregression. The output standard deviation of a previous step can be provided as input as an error measure to the machine learning function 502. In some aspects, for example, the UE may determine multiple candidate inputs for the input of one beam. For example, the UE may identify a prior RSRP estimate from a previous long short term (LSTM) prediction and another prior estimate from spatial domain interpolation from a current step. In some aspects, the network may configure a rule for the UE to select which RSRP (or other communication metric) can be used as the input of the prediction. For example, in some aspects, the UE may select the input corresponding to the smaller interpolation and/or prediction error between the two candidates.

As indicated above, FIG. 5 is provided as an example. Other examples may differ from what is described with respect to FIG. 5.

Figure 6:
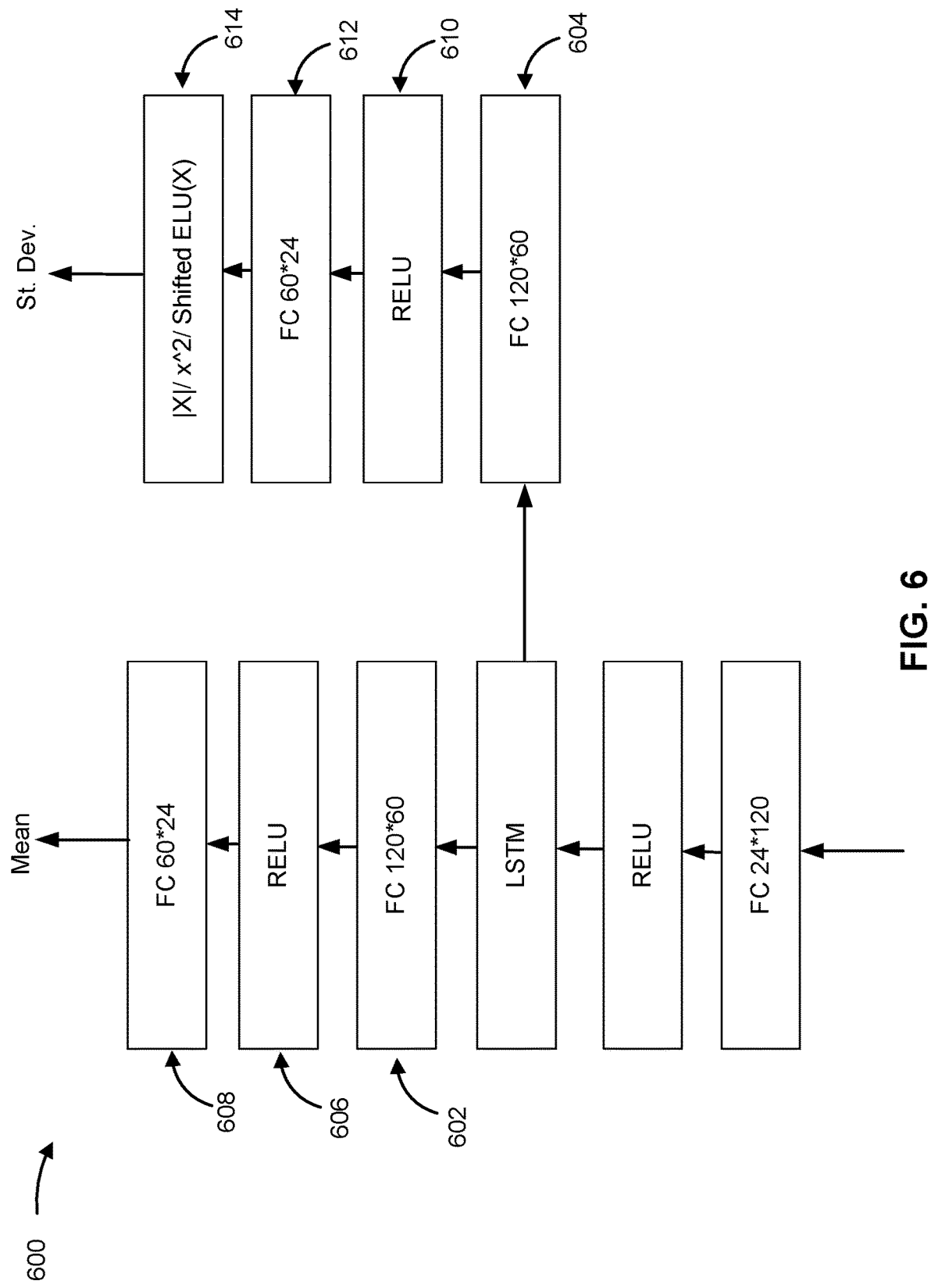

FIG. 6 is a diagram illustrating an example 600 associated with machine learning for beam predictions with confidence indications, in accordance with the present disclosure. Example 600 illustrates an output layer design. The output layer design may be implemented by the machine learning model 412 depicted in FIG. 4.

As shown, a first fully connected layer (FC 24*120) may produce a first output having a first number of dimensions. A rectified linear unit (RELU) activation layer may receive the first output and produce a second output having the first number of dimensions. An LSTM layer may receive an output of the RELU activation layer and may provide an output to a second fully connected layer (FC 120*60) 602. A parallel output layer stack may include a fully connected layer (FC 120*60) 604. The LSTM layer may provide the output to both fully connected layers 602 and 604. The fully connected layer 602 may be connected to another RELU 606 and a final fully connected layer 608. The fully connected layer 604 may be connected to a RELU 610, another fully connected layer (FC 60*24) 612, and a shifted exponential linear unit (ELU) 614. While the fully connected layer 608 may be configured to output a mean communication metric, the shifted ELU layer 614 may be configured to output a standard deviation.

In some aspects, for example, the error measurement may include at least one prior confidence indication associated with the prior predicted communication metric. The UE may generate the predicted standard deviation based on an activation function. The activation function may be based at least in part on at least one of the shifted ELU or an optimal epsilon (eps) value. For example, the shifted ELU output may be given by ELU(x)+1+eps, where eps corresponds to a predefined small positive number. In some aspects, the activation function may be given by |X|+eps, X^2+eps, or |X+eps|, among other examples. In some aspects, the output may be non-negative. For better convergence when applying certain loss function (e.g., the negative log likelihood function) during model training, the output of the standard deviation prediction layers may be configured to be positive in most cases. Alternatively, in some aspects, prior knowledge of the range of the standard deviation (e.g., the maximum standard deviation) may be used to facilitate producing a shifted and scaled version of a softmax, tanh function as the output layer. The scaling or shifting factor applied on the softmax or tanh function may be determined by the prior knowledge of the standard deviation range.

In some aspects, the activation function may be selected based on a balance between standard deviation prediction accuracy and training convergence rate. In some aspects, if an eps value is used, a small positive offset may be added to avoid a steep gradient region in the loss function.

In some aspects, the UE may use dedicated hardware and/or software to run the machine learning model. In some aspects, the UE may support a customized output activation layer, as described above. In some other aspects, the UE may not support a customized output activation layer, as described above. In some aspects, for example, the UE may report the activation function type capability of the UE to the network node.

As indicated above, FIG. 6 is provided as an example. Other examples may differ from what is described with respect to FIG. 6.

Figure 7:
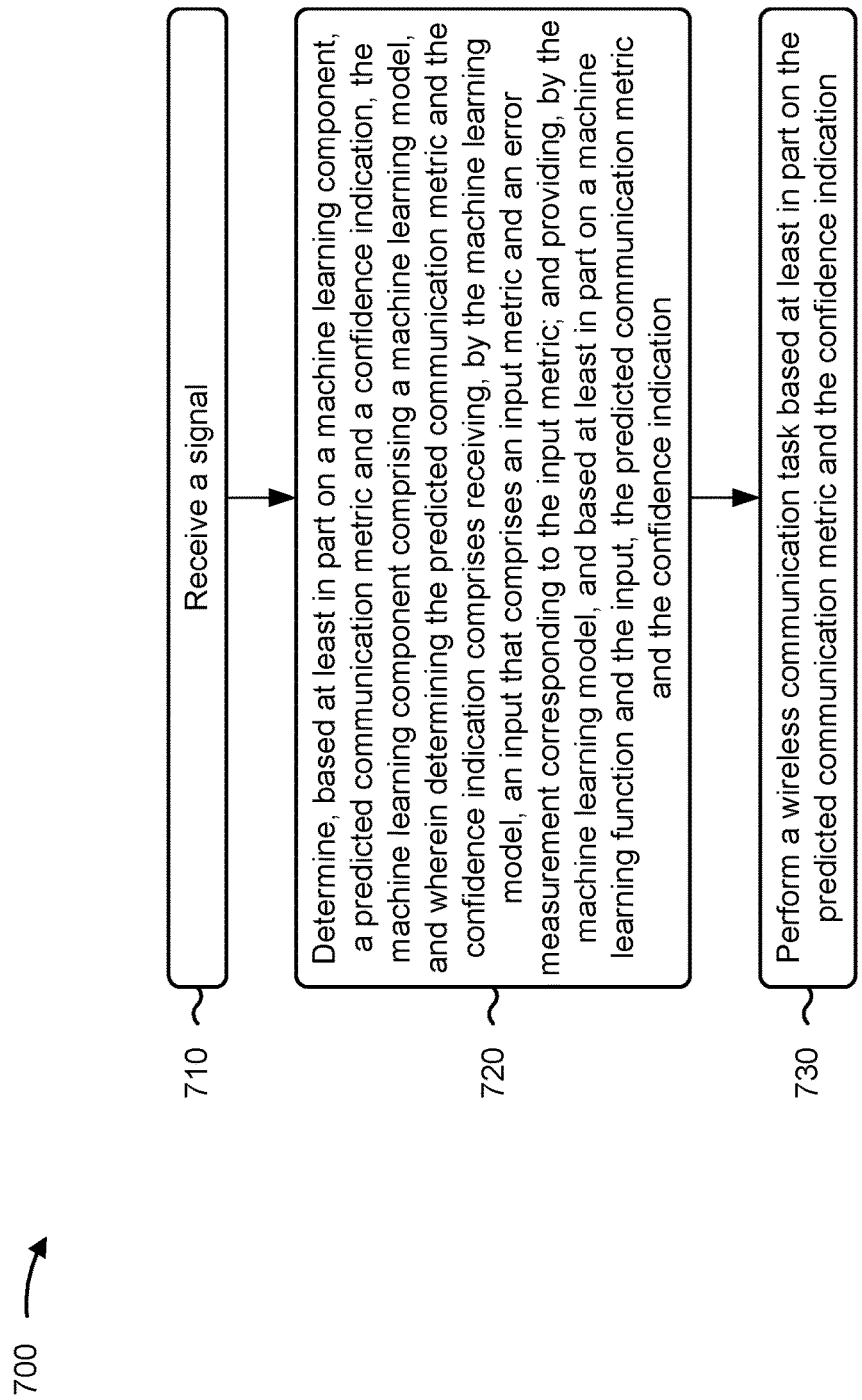
FIGS. 7 and 8 are diagrams illustrating example processes associated with machine learning for beam predictions with confidence indications, in accordance with the present disclosure.

FIG. 7 is a diagram illustrating an example process 700 performed, for example, by a UE, in accordance with the present disclosure. Example process 700 is an example where the UE (e.g., UE 402) performs operations associated with machine learning for beam predictions with confidence indicators.

As shown in FIG. 7, in some aspects, process 700 may include receiving a signal (block 710). For example, the UE (e.g., using communication manager 908 and/or reception component 902, depicted in FIG. 9) may receive a signal, as described above.

As further shown in FIG. 7, in some aspects, process 700 may include determining, based at least in part on a machine learning component, a predicted communication metric and a confidence indication, the machine learning component comprising a machine learning model, and wherein determining the predicted communication metric and the confidence indication comprises: receiving, by the machine learning model, an input that comprises an input metric and an error measurement corresponding to the input metric; and providing, by the machine learning model, and based at least in part on a machine learning function and the input, the predicted communication metric and the confidence indication (block 720). For example, the UE (e.g., using communication manager 908 and/or determination component 910, depicted in FIG. 9) may determine, based at least in part on a machine learning component, a predicted communication metric and a confidence indication, the machine learning component comprising a machine learning model, and wherein determining the predicted communication metric and the confidence indication comprises: receiving, by the machine learning model, an input that comprises an input metric and an error measurement corresponding to the input metric; and providing, by the machine learning model, and based at least in part on a machine learning function and the input, the predicted communication metric and the confidence indication, as described above.

As further shown in FIG. 7, in some aspects, process 700 may include performing a wireless communication task based at least in part on the predicted communication metric and the confidence indication (block 730). For example, the UE (e.g., using communication manager 908, reception component 902, and/or transmission component 904, depicted in FIG. 9) may perform a wireless communication task based at least in part on the predicted communication metric and the confidence indication, as described above.

Process 700 may include additional aspects, such as any single aspect or any combination of aspects described below and/or in connection with one or more other processes described elsewhere herein.

In some aspects, the input metric comprises an RSRP, and wherein the predicted communication metric comprises a predicted RSRP. In some aspects, the confidence indication comprises a standard deviation associated with the predicted communication metric. In some aspects, the input metric comprises an interpolated metric value. In some aspects, process 700 includes determining a plurality of interpolated metric values that include the interpolated metric value, and selecting the interpolated metric value based at least in part on the error measurement comprising a smallest error measurement of a plurality of error measurements corresponding to the plurality of interpolated metric values.

In some aspects, process 700 includes transmitting a model error report that indicates a model inference error associated with the predicted communication metric. In some aspects, transmitting the model error report comprises transmitting the model error report based at least in part on at least one analytic metric associated with the predicted communication metric satisfying a reporting condition. In some aspects, the at least one analytic metric comprises at least one of a mean deviation or a standard deviation. In some aspects, the analytic metric may be a likelihood. For example, the likelihood may be computed based on a predicted mean, a predicted standard deviation, and/or a measured value. In some aspects, the likelihood may be computed using a function configured by a network node (e.g., a network-configured function).

In some aspects, process 700 includes receiving a machine learning configuration associated with the machine learning component. In some aspects, the machine learning function comprises a first set of input ports associated with a set of reference signals, a second set of input ports associated with a set of error metrics, wherein the set of error metrics includes the error measurement, a first set of output ports associated with a set of predicted communication metrics, wherein the set of predicted communication metrics includes the predicted communication metric, and a second set of output ports associated with a set of confidence measurement outputs, wherein the set of confidence measurement outputs includes the confidence indication. In a tenth aspect, alone or in combination with the ninth aspect, the set of reference signals comprises at least one of a synchronization signal block or a channel state information reference signal.

In some aspects, the first set of input ports is associated with at least one transmission configuration indication. In some aspects, the set of confidence measurement outputs comprises at least one of a standard deviation, a variance, a confidence range, or a failure probability. In some aspects, the set of error metrics comprises at least one of a time stamp, a measurement indication, an interpolation error, a measurement error, a prediction error, or an interference estimation.

In some aspects, process 700 includes performing a pre-processing operation corresponding to the set of reference signals. In some aspects, performing the pre-processing operation comprises normalizing a set of input data. In some aspects, normalizing the set of input data comprises normalizing the set of input data based at least in part on a normalization metric. In some aspects, the normalization metric comprises at least one of a mean deviation or a standard deviation. In some aspects, process 700 includes receiving an indication of the normalization metric.

In some aspects, process 700 includes obtaining a set of measurements associated with a subset of the set of reference signals, wherein the subset includes fewer reference signals than the set of reference signals. In some aspects, obtaining the set of measurements comprises skipping at least one configured measurement based at least in part on receiving a downlink communication during a measurement occasion corresponding to the configured measurement.

In some aspects, obtaining the set of measurements comprises obtaining a first measurement using a first reception beam and obtaining a second measurement using a second reception beam. In some aspects, process 700 includes generating a measurement pattern indication corresponding to the set of measurements. In some aspects, the measurement pattern indication indicates at least one of an input port, of the set of input ports, for which a measurement was not obtained, or an input port, of the set of input ports, for which a measurement was obtained.

In some aspects, process 700 includes receiving a configuration associated with a measurement input format corresponding to the measurement pattern indication, wherein generating the measurement pattern indication comprises generating the measurement pattern indication based at least in part on the measurement input format. In some aspects, process 700 includes generating an interpolated measurement corresponding to a port for which a measurement is not obtained. In some aspects, the measurement pattern indication includes an indication of an interpolation error corresponding to the interpolated measurement.

In some aspects, the measurement pattern indication indicates an interpolation error value of zero associated with a port for which a measurement is obtained. In some aspects, generating the interpolated measurement comprises performing a spatial interpolation associated with at least one obtained measurement. In some aspects, generating the interpolated measurement comprises performing a time domain interpolation associated with at least one obtained measurement corresponding to a prior measurement occasion.

In some aspects, the input metric comprises at least one of a prior predicted communication metric or an interpolated measurement. In some aspects, providing the predicted communication metric comprises performing an autoregression procedure associated with the prior predicted communication metric. In some aspects, the error measurement comprises at least one prior confidence indication associated with the prior predicted communication metric. In some aspects, process 700 includes selecting the input metric from a plurality of potential input metrics associated with a beam based at least in part on a selection criterion.

In some aspects, providing the confidence indication comprises determining, using a dedicated output layer, a predicted standard deviation. In some aspects, generating the predicted standard deviation comprises generating the predicted standard deviation based at least in part on an activation function, wherein the activation function is based at least in part on at least one of a shifted exponential linear unit or an optimal epsilon value. In some aspects, process 700 includes receiving an epsilon value configuration that indicates the optimal epsilon value.

In some aspects, providing the confidence indication comprises determining a mean corresponding to the predicted communication metric. In some aspects, providing the confidence indication comprises determining the confidence indication using a central processing unit and based at least in part on an output from a plurality of configured model layers. In some aspects, process 700 includes transmitting a capability report that indicates a capability of the UE to provide the confidence indication. In some aspects, the capability report further indicates a supported activation type associated with an output layer of the machine learning model.

In some aspects, process 700 includes transmitting, using an over-the-air communication, an output report associated with the machine learning component, the output report indicating at least one of the predicted communication metric or the confidence indication. In some aspects, the output report corresponds to a dedicated uplink control information type associated with a physical layer beam report. In some aspects, transmitting the output report comprises transmitting the output report based at least in part on at least one analytic metric associated with the predicted communication metric satisfying a reporting condition.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
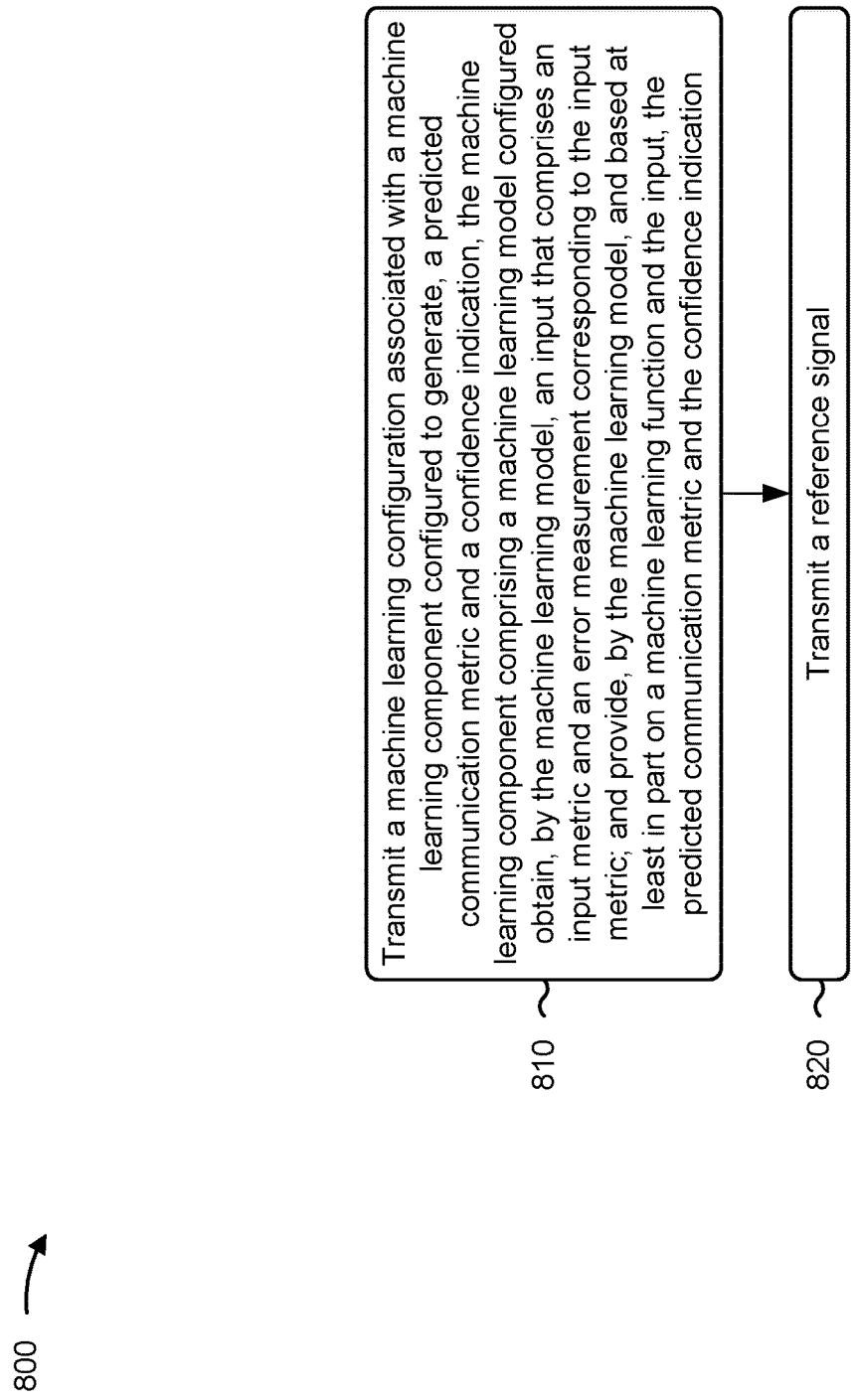

FIG. 8 is a diagram illustrating an example process 800 performed, for example, by a network node, in accordance with the present disclosure. Example process 800 is an example where the network node (e.g., network node 404) performs operations associated with machine learning for beam predictions with confidence indicators.

As shown in FIG. 8, in some aspects, process 800 may include transmitting a machine learning configuration associated with a machine learning component configured to generate, a predicted communication metric and a confidence indication, the machine learning component comprising a machine learning model configured to: obtain, by the machine learning model, an input that comprises an input metric and an error measurement corresponding to the input metric; and provide, by the machine learning model, and based at least in part on a machine learning function and the input, the predicted communication metric and the confidence indication (block 810). For example, the network node (e.g., using communication manager 1008 and/or transmission component 1004, depicted in FIG. 10) may transmit a machine learning configuration associated with a machine learning component configured to generate, a predicted communication metric and a confidence indication, the machine learning component comprising a machine learning model configured to: obtain, by the machine learning model, an input that comprises an input metric and an error measurement corresponding to the input metric; and provide, by the machine learning model, and based at least in part on a machine learning function and the input, the predicted communication metric and the confidence indication, as described above.

As further shown in FIG. 8, in some aspects, process 800 may include transmitting a reference signal (block 820). For example, the network node (e.g., using communication manager 1008 and/or transmission component 1004, depicted in FIG. 10) may transmit a reference signal, as described above.

Process 800 may include additional aspects, such as any single aspect or any combination of aspects described below and/or in connection with one or more other processes described elsewhere herein.

In some aspects, the input metric comprises an RSRP associated with the reference signal, and wherein the predicted communication metric comprises a predicted RSRP. In some aspects, the confidence indication comprises a standard deviation associated with the predicted communication metric. In some aspects, the input metric comprises an interpolated metric value. In some aspects, process 800 includes receiving a model error report that indicates a model inference error associated with the predicted communication metric. In some aspects, receiving the model error report comprises receiving the model error report based at least in part on at least one analytic metric associated with the predicted communication metric satisfying a reporting condition. In some aspects, the at least one analytic metric comprises at least one of a mean deviation or a standard deviation.

In some aspects, the machine learning function comprises a first set of input ports associated with a set of reference signals, a second set of input ports associated with a set of error metrics, wherein the set of error metrics includes the error measurement, a first set of output ports associated with a set of predicted communication metrics, wherein the set of predicted communication metrics includes the predicted communication metric, and a second set of output ports associated with a set of confidence measurement outputs, wherein the set of confidence measurement outputs includes the confidence indication. In some aspects, the set of reference signals comprises at least one of a synchronization signal block or a channel state information reference signal.

In some aspects, the first set of input ports is associated with at least one transmission configuration indication. In some aspects, the set of confidence measurement outputs comprises at least one of a standard deviation, a variance, a confidence range, or a failure probability. In some aspects, the set of error metrics comprises at least one of a time stamp, a measurement indication, an interpolation error, or a measurement error.

In some aspects, the machine learning component is further configured to perform a pre-processing operation corresponding to the set of reference signals. In some aspects, the pre-processing operation comprises a normalization operation associated with a set of input data. In some aspects, the normalization operation is configured to normalize the set of input data based at least in part on a normalization metric.

In some aspects, the normalization metric comprises at least one of a mean deviation or a standard deviation. In some aspects, process 800 includes transmitting an indication of the normalization metric. In some aspects, process 800 includes transmitting a configuration associated with a measurement input format corresponding to a measurement pattern indication, wherein the measurement pattern indication indicates at least one of an input port, of the set of input ports, for which a measurement was not obtained, or an input port, of the set of input ports, for which a measurement was obtained. In some aspects, the measurement pattern indication includes an indication of an interpolation error corresponding to an interpolated measurement corresponding to a port for which a measurement is not obtained. In some aspects, the measurement pattern indication indicates an interpolation error value of zero associated with a port for which a measurement is obtained.

In some aspects, the input metric comprises at least one of a prior predicted communication metric or an interpolated measurement. In some aspects, to provide the predicted communication metric, the machine learning model is configured to perform an autoregression procedure associated with the prior predicted communication metric. In some aspects, the error measurement comprises at least one prior confidence indication associated with the prior predicted communication metric.

In some aspects, the machine learning component comprises a dedicated output layer configured to generate a predicted standard deviation. In some aspects, to generate the predicted standard deviation, the machine learning component is configured to generate the predicted standard deviation based at least in part on an activation function, wherein the activation function is based at least in part on at least one of a shifted exponential linear unit or an optimal epsilon value. In some aspects, process 800 includes transmitting an epsilon value configuration that indicates the optimal epsilon value. In some aspects, to provide the confidence indication, the machine learning component is configured to determine a mean corresponding to the predicted communication metric.

In some aspects, process 800 includes receiving, from a UE, a capability report that indicates a capability of the UE to provide the confidence indication. In some aspects, the capability report further indicates a supported activation type associated with an output layer of the machine learning model. In some aspects, process 800 includes receiving, using an over-the-air communication, an output report associated with the machine learning component, the output report indicating at least one of the predicted communication metric or the confidence indication. In some aspects, the output report corresponds to a dedicated uplink control information type associated with a physical layer beam report. In some aspects, receiving the output report comprises receiving the output report based at least in part on at least one analytic metric associated with the predicted communication metric satisfying a reporting condition.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
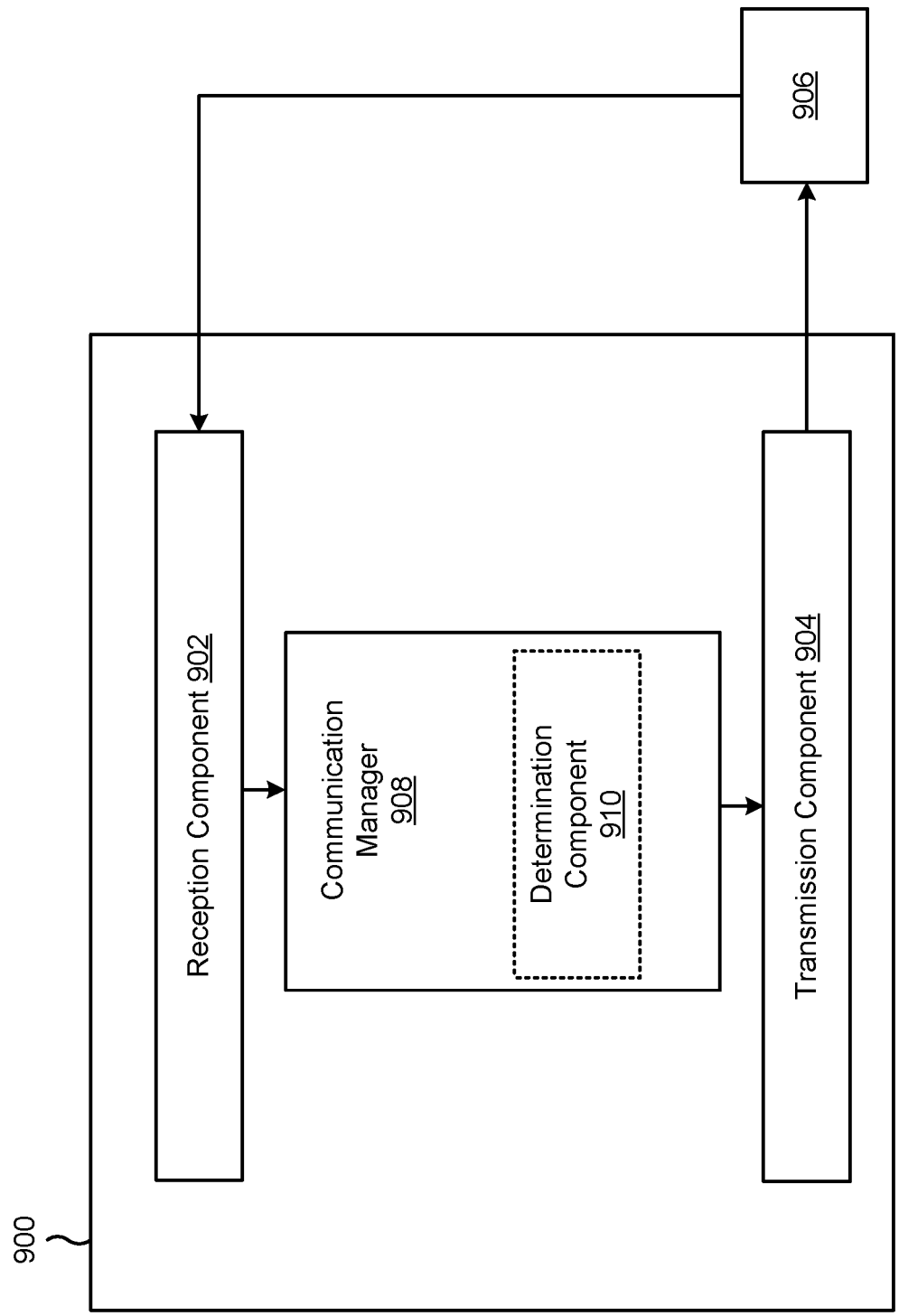
FIGS. 9 and 10 are diagrams of example apparatuses for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a communication manager 908. The communication manager 908 may include a determination component 910.

In some aspects, the apparatus 900 may be configured to perform one or more operations described herein in connection with FIGS. 4-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive a signal. The communication manager 908 and/or the determination component 910 may determine, based at least in part on a machine learning component, a predicted communication metric and a confidence indication, the machine learning component comprising a machine learning model, and wherein determining the predicted communication metric and the confidence indication comprises receiving, by the machine learning model, an input that comprises an input metric and an error measurement corresponding to the input metric; and providing, by the machine learning model, and based at least in part on a machine learning function and the input, the predicted communication metric and the confidence indication. In some aspects, the communication manager 908 may include one or more antennas, a modem, a controller/processor, a memory, or a combination thereof, of the UE described in connection with FIG. 2. In some aspects, the communication manager 908 may include the reception component 902 and/or the transmission component 904. In some aspects, the communication manager 908 may be, be similar to, include, or be included in, the communication manager 140 depicted in FIGS. 1 and 2. In some aspects, the determination component 910 may include one or more antennas, a modem, a controller/processor, a memory, or a combination thereof, of the UE described in connection with FIG. 2. In some aspects, determination component 910 may include the reception component 902 and/or the transmission component 904.

The communication manager 908, the reception component 902, and/or the transmission component 904, may perform a wireless communication task based at least in part on the predicted communication metric and the confidence indication. The determination component 910 may determine a plurality of interpolated metric values that include the interpolated metric value. The determination component 910 may select the interpolated metric value based at least in part on the error measurement comprising a smallest error measurement of a plurality of error measurements corresponding to the plurality of interpolated metric values.

The transmission component 904 may transmit a model error report that indicates a model inference error associated with the predicted communication metric. The reception component 902 may receive a machine learning configuration associated with the machine learning component. The communication manager 908, the reception component 902, and/or the transmission component 904 may perform a pre-processing operation corresponding to the set of reference signals. The reception component 902 may receive an indication of the normalization metric.

The communication manager 908 and/or reception component 902 may obtain a set of measurements associated with a subset of the set of reference signals, wherein the subset includes fewer reference signals than the set of reference signals. The communication manager 908 may generate a measurement pattern indication corresponding to the set of measurements.

The reception component 902 may receive a configuration associated with a measurement input format corresponding to the measurement pattern indication, wherein generating the measurement pattern indication comprises generating the measurement pattern indication based at least in part on the measurement input format. The communication manager 908 may generate an interpolated measurement corresponding to a port for which a measurement is not obtained. The determination component 910 may select the input metric from a plurality of potential input metrics associated with a beam based at least in part on a selection criterion.

The reception component 902 may receive an epsilon value configuration that indicates the optimal epsilon value. The transmission component 904 may transmit a capability report that indicates a capability of the UE to provide the confidence indication. The transmission component 904 may transmit, using an over-the-air communication, an output report associated with the machine learning component, the output report indicating at least one of the predicted communication metric or the confidence indication.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
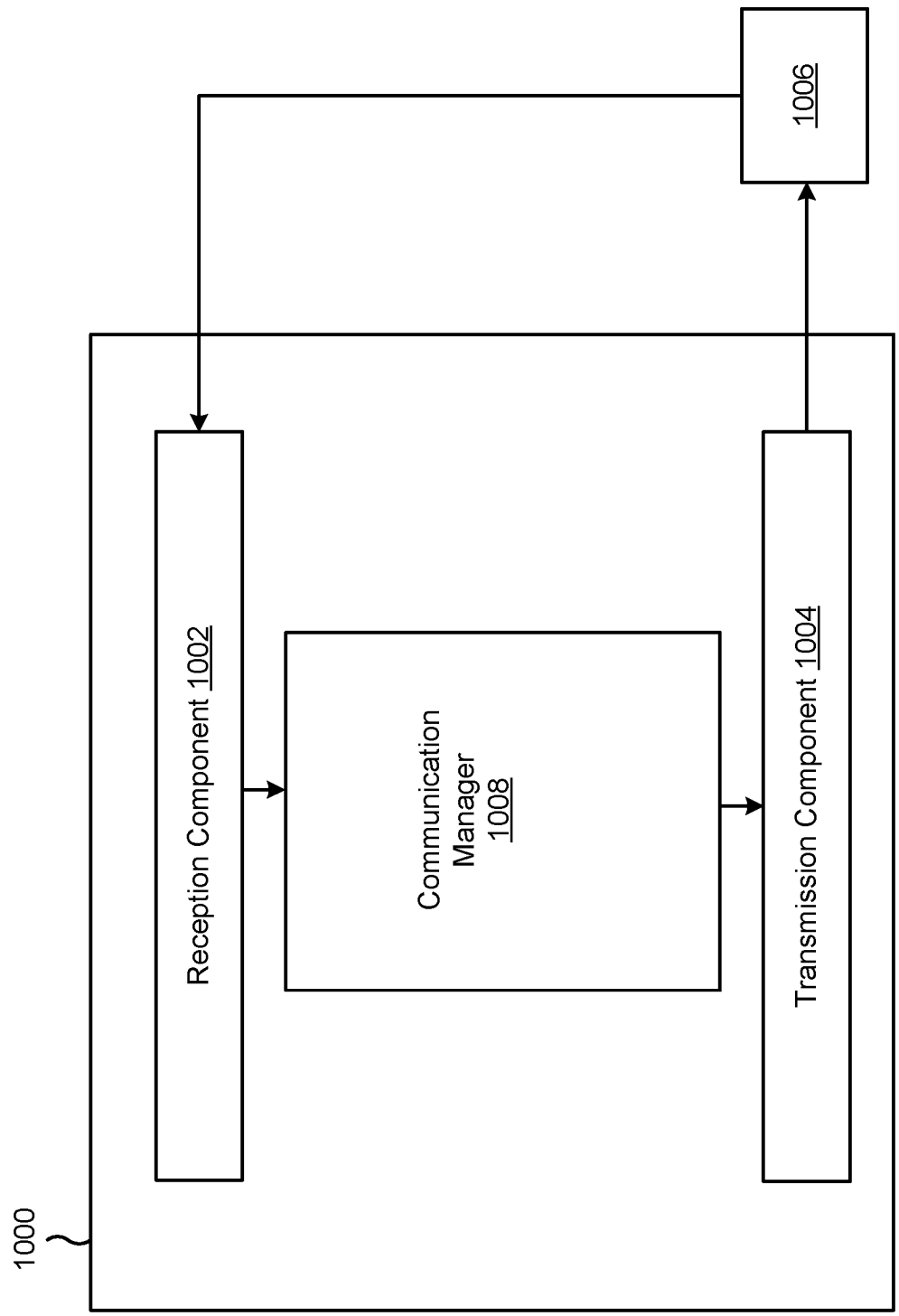

FIG. 10 is a diagram of an example apparatus 1000 for wireless communication. The apparatus 1000 may be a network node, or a network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager 1008.

In some aspects, the apparatus 1000 may be configured to perform one or more operations described herein in connection with FIGS. 4-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE and/or the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE and/or the base station described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE and/or the base station described in connection with FIG. 2. In some aspects, the transmission component 1004 may be co-located with the reception component 1002 in a transceiver.

The communication manager 1008 and/or the transmission component 1004 may transmit a machine learning configuration associated with a machine learning component configured to generate, a predicted communication metric and a confidence indication, the machine learning component comprising a machine learning model configured obtain, by the machine learning model, an input that comprises an input metric and an error measurement corresponding to the input metric; and provide, by the machine learning model, and based at least in part on a machine learning function and the input, the predicted communication metric and the confidence indication. In some aspects, the communication manager 1008 may include one or more antennas, a modem, a controller/processor, a memory, or a combination thereof, of the UE and/or the base station described in connection with FIG. 2. In some aspects, the communication manager 1008 may include the reception component 1002 and/or the transmission component 1004. In some aspects, the communication manager 1008 may be, be similar to, include, or be included in, the communication manager 140 or the communication manager 150 depicted in FIGS. 1 and 2.

The transmission component 1004 may transmit a reference signal. The reception component 1002 may receive a model error report that indicates a model inference error associated with the predicted communication metric. The transmission component 1004 may transmit an indication of the normalization metric. The transmission component 1004 may transmit a configuration associated with a measurement input format corresponding to a measurement pattern indication, wherein the measurement pattern indication indicates at least one of an input port, of the set of input ports, for which a measurement was not obtained, or an input port, of the set of input ports, for which a measurement was obtained.

The transmission component 1004 may transmit an epsilon value configuration that indicates the optimal epsilon value. The reception component 1002 may receive, from a UE, a capability report that indicates a capability of the UE to provide the confidence indication. The reception component 1002 may receive, using an over-the-air communication, an output report associated with the machine learning component, the output report indicating at least one of the predicted communication metric or the confidence indication.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving a signal; determining, based at least in part on a machine learning component, a predicted communication metric and a confidence indication, the machine learning component comprising a machine learning model, and wherein determining the predicted communication metric and the confidence indication comprises: receiving, by the machine learning model, an input that comprises an input metric and an error measurement corresponding to the input metric; and providing, by the machine learning model, and based at least in part on a machine learning function and the input, the predicted communication metric and the confidence indication; and performing a wireless communication task based at least in part on the predicted communication metric and the confidence indication.

Aspect 2: The method of Aspect 1, wherein the input metric comprises a reference signal received power (RSRP), and wherein the predicted communication metric comprises a predicted RSRP.

Aspect 3: The method of either of Aspects 1 or 2, wherein the confidence indication comprises a standard deviation associated with the predicted communication metric.

Aspect 4: The method of any of Aspects 1-3, wherein the input metric comprises an interpolated metric value.

Aspect 5: The method of Aspect 4, further comprising: determining a plurality of interpolated metric values that include the interpolated metric value; and selecting the interpolated metric value based at least in part on the error measurement comprising a smallest error measurement of a plurality of error measurements corresponding to the plurality of interpolated metric values.

Aspect 6: The method of any of Aspects 1-5, further comprising transmitting a model error report that indicates a model inference error associated with the predicted communication metric.

Aspect 7: The method of Aspect 6, wherein transmitting the model error report comprises transmitting the model error report based at least in part on at least one analytic metric associated with the predicted communication metric satisfying a reporting condition.

Aspect 8: The method of Aspect 7, wherein the at least one analytic metric comprises at least one of a mean deviation or a standard deviation.

Aspect 9: The method of any of Aspects 1-8, further comprising receiving a machine learning configuration associated with the machine learning component.

Aspect 10: The method of any of Aspects 1-9, wherein the machine learning function comprises: a first set of input ports associated with a set of reference signals; a second set of input ports associated with a set of error metrics, wherein the set of error metrics includes the error measurement; a first set of output ports associated with a set of predicted communication metrics, wherein the set of predicted communication metrics includes the predicted communication metric; and a second set of output ports associated with a set of confidence measurement outputs, wherein the set of confidence measurement outputs includes the confidence indication.

Aspect 11: The method of Aspect 10, wherein the set of reference signals comprises at least one of a synchronization signal block or a channel state information reference signal.

Aspect 12: The method of either of Aspects 10 or 11, wherein the first set of input ports is associated with at least one transmission configuration indication.

Aspect 13: The method of any of Aspects 10-12, wherein the set of confidence measurement outputs comprises at least one of a standard deviation, a variance, a confidence range, or a failure probability.

Aspect 14: The method of any of Aspects 10-13, wherein the set of error metrics comprises at least one of a time stamp, a measurement indication, an interpolation error, or a measurement error.

Aspect 15: The method of any of Aspects 10-14, further comprising performing a pre-processing operation corresponding to the set of reference signals.

Aspect 16: The method of Aspect 15, wherein performing the pre-processing operation comprises normalizing a set of input data.

Aspect 17: The method of either of Aspects 15 or 16, wherein normalizing the set of input data comprises normalizing the set of input data based at least in part on a normalization metric.

Aspect 18: The method of Aspect 17, wherein the normalization metric comprises at least one of a mean deviation or a standard deviation.

Aspect 19: The method of either of Aspects 17 or 18, further comprising receiving an indication of the normalization metric.

Aspect 20: The method of any of Aspects 10-19, further comprising obtaining a set of measurements associated with a subset of the set of reference signals, wherein the subset includes fewer reference signals than the set of reference signals.

Aspect 21: The method of Aspect 20, wherein obtaining the set of measurements comprises skipping at least one configured measurement based at least in part on receiving a downlink communication during a measurement occasion corresponding to the configured measurement.

Aspect 22: The method of either of Aspects 20 or 21, wherein obtaining the set of measurements comprises obtaining a first measurement using a first reception beam and obtaining a second measurement using a second reception beam.

Aspect 23: The method of any of Aspects 20-22, further comprising generating a measurement pattern indication corresponding to the set of measurements.

Aspect 24: The method of Aspect 23, wherein the measurement pattern indication indicates at least one of an input port, of the set of input ports, for which a measurement was not obtained, or an input port, of the set of input ports, for which a measurement was obtained.

Aspect 25: The method of either of Aspects 23 or 24, further comprising receiving a configuration associated with a measurement input format corresponding to the measurement pattern indication, wherein generating the measurement pattern indication comprises generating the measurement pattern indication based at least in part on the measurement input format.

Aspect 26: The method of any of Aspects 23-25, further comprising generating an interpolated measurement corresponding to a port for which a measurement is not obtained.

Aspect 27: The method of Aspect 26, wherein the measurement pattern indication includes an indication of an interpolation error corresponding to the interpolated measurement.

Aspect 28: The method of either of Aspects 26 or 27, wherein the measurement pattern indication indicates an interpolation error value of zero associated with a port for which a measurement is obtained.

Aspect 29: The method of any of Aspects 26-28, wherein generating the interpolated measurement comprises performing a spatial interpolation associated with at least one obtained measurement.

Aspect 30: The method of any of Aspects 26-29, wherein generating the interpolated measurement comprises performing a time domain interpolation associated with at least one obtained measurement corresponding to a prior measurement occasion.

Aspect 31: The method of any of Aspects 1-30, wherein the input metric comprises at least one of a prior predicted communication metric or an interpolated measurement.

Aspect 32: The method of Aspect 31, wherein providing the predicted communication metric comprises performing an autoregression procedure associated with the prior predicted communication metric.

Aspect 33: The method of Aspect 32, wherein the error measurement comprises at least one prior confidence indication associated with the prior predicted communication metric.

Aspect 34: The method of any of Aspects 31-33, further comprising selecting the input metric from a plurality of potential input metrics associated with a beam based at least in part on a selection criterion.

Aspect 35: The method of any of Aspects 1-34, wherein providing the confidence indication comprises determining, using a dedicated output layer, a predicted standard deviation.

Aspect 36: The method of Aspect 35, wherein generating the predicted standard deviation comprises generating the predicted standard deviation based at least in part on an activation function, wherein the activation function is based at least in part on at least one of a shifted exponential linear unit or an optimal epsilon value.

Aspect 37: The method of Aspect 36, further comprising receiving an epsilon value configuration that indicates the optimal epsilon value.

Aspect 38: The method of any of Aspects 1-37, wherein providing the confidence indication comprises determining a mean corresponding to the predicted communication metric.

Aspect 39: The method of any of Aspects 1-38, wherein providing the confidence indication comprises determining the confidence indication using a central processing unit and based at least in part on an output from a plurality of configured model layers.

Aspect 40: The method of any of Aspects 1-39, further comprising transmitting a capability report that indicates a capability of the UE to provide the confidence indication.

Aspect 41: The method of Aspect 40, wherein the capability report further indicates a supported activation type associated with an output layer of the machine learning model.

Aspect 42: The method of any of Aspects 1-41, further comprising transmitting, using an over-the-air communication, an output report associated with the machine learning component, the output report indicating at least one of the predicted communication metric or the confidence indication.

Aspect 43: The method of Aspect 42, wherein the output report corresponds to a dedicated uplink control information type associated with a physical layer beam report.

Aspect 44: The method of either of Aspects 42 or 43, wherein transmitting the output report comprises transmitting the output report based at least in part on at least one analytic metric associated with the predicted communication metric satisfying a reporting condition.

Aspect 45: A method of wireless communication performed by a network node, comprising: transmitting a machine learning configuration associated with a machine learning component configured to generate, a predicted communication metric and a confidence indication, the machine learning component comprising a machine learning model configured to: obtain, by the machine learning model, an input that comprises an input metric and an error measurement corresponding to the input metric; and providing, by the machine learning model, and based at least in part on a machine learning function and the input, the predicted communication metric and the confidence indication; and transmitting a reference signal.

Aspect 46: The method of Aspect 45, wherein the input metric comprises a reference signal received power (RSRP) associated with the reference signal, and wherein the predicted communication metric comprises a predicted RSRP.

Aspect 47: The method of either of Aspects 45 or 46, wherein the confidence indication comprises a standard deviation associated with the predicted communication metric.

Aspect 48: The method of any of Aspects 45-47, wherein the input metric comprises an interpolated metric value.

Aspect 49: The method of any of Aspects 45-48, further comprising receiving a model error report that indicates a model inference error associated with the predicted communication metric.

Aspect 50: The method of Aspect 49, wherein receiving the model error report comprises receiving the model error report based at least in part on at least one analytic metric associated with the predicted communication metric satisfying a reporting condition.

Aspect 51: The method of Aspect 50, wherein the at least one analytic metric comprises at least one of a mean deviation or a standard deviation.

Aspect 52: The method of any of Aspects 45-51, wherein the machine learning function comprises: a first set of input ports associated with a set of reference signals; a second set of input ports associated with a set of error metrics, wherein the set of error metrics includes the error measurement; a first set of output ports associated with a set of predicted communication metrics, wherein the set of predicted communication metrics includes the predicted communication metric; and a second set of output ports associated with a set of confidence measurement outputs, wherein the set of confidence measurement outputs includes the confidence indication.

Aspect 53: The method of Aspect 52, wherein the set of reference signals comprises at least one of a synchronization signal block or a channel state information reference signal.

Aspect 54: The method of either of Aspects 52 or 53, wherein the first set of input ports is associated with at least one transmission configuration indication.

Aspect 55: The method of any of Aspects 52-54, wherein the set of confidence measurement outputs comprises at least one of a standard deviation, a variance, a confidence range, or a failure probability.

Aspect 56: The method of any of Aspects 52-55, wherein the set of error metrics comprises at least one of a time stamp, a measurement indication, an interpolation error, or a measurement error.

Aspect 57: The method of any of Aspects 52-56, wherein the machine learning component is further configured to perform a pre-processing operation corresponding to the set of reference signals.

Aspect 58: The method of Aspect 57, wherein the pre-processing operation comprises a normalization operation associated with a set of input data.

Aspect 59: The method of Aspect 58, wherein the normalization operation is configured to normalize the set of input data based at least in part on a normalization metric.

Aspect 60: The method of Aspect 59, wherein the normalization metric comprises at least one of a mean deviation or a standard deviation.

Aspect 61: The method of either of Aspects 59 or 60, further comprising transmitting an indication of the normalization metric.

Aspect 62: The method of any of Aspects 52-61, further comprising transmitting a configuration associated with a measurement input format corresponding to a measurement pattern indication, wherein the measurement pattern indication indicates at least one of an input port, of the set of input ports, for which a measurement was not obtained, or an input port, of the set of input ports, for which a measurement was obtained.

Aspect 63: The method of Aspect 62, wherein the measurement pattern indication includes an indication of an interpolation error corresponding to an interpolated measurement corresponding to a port for which a measurement is not obtained.

Aspect 64: The method of either of Aspects 62 or 63, wherein the measurement pattern indication indicates an interpolation error value of zero associated with a port for which a measurement is obtained.

Aspect 65: The method of any of Aspects 45-64, wherein the input metric comprises at least one of a prior predicted communication metric or an interpolated measurement.

Aspect 66: The method of Aspect 65, wherein, to provide the predicted communication metric, the machine learning model is configured to perform an autoregression procedure associated with the prior predicted communication metric.

Aspect 67: The method of Aspect 66, wherein the error measurement comprises at least one prior confidence indication associated with the prior predicted communication metric.

Aspect 68: The method of any of Aspects 45-67, wherein the machine learning component comprises a dedicated output layer configured to generate a predicted standard deviation.

Aspect 69: The method of Aspect 68, wherein, to generate the predicted standard deviation, the machine learning component is configured to generate the predicted standard deviation based at least in part on an activation function, wherein the activation function is based at least in part on at least one of a shifted exponential linear unit or an optimal epsilon value.

Aspect 70: The method of Aspect 69, further comprising transmitting an epsilon value configuration that indicates the optimal epsilon value.

Aspect 71: The method of any of Aspects 45-70, wherein, to provide the confidence indication, the machine learning component is configured to determine a mean corresponding to the predicted communication metric.

Aspect 72: The method of any of Aspects 45-71, further comprising receiving, from a user equipment (UE), a capability report that indicates a capability of the UE to provide the confidence indication.

Aspect 73: The method of Aspect 72, wherein the capability report further indicates a supported activation type associated with an output layer of the machine learning model.

Aspect 74: The method of any of Aspects 45-73, further comprising receiving, using an over-the-air communication, an output report associated with the machine learning component, the output report indicating at least one of the predicted communication metric or the confidence indication.

Aspect 75: The method of Aspect 74, wherein the output report corresponds to a dedicated uplink control information type associated with a physical layer beam report.

Aspect 76: The method of either of Aspects 74 or 75, wherein receiving the output report comprises receiving the output report based at least in part on at least one analytic metric associated with the predicted communication metric satisfying a reporting condition.

Aspect 77: An apparatus for wireless communication at a device, comprising a processor; memory coupled with the processor; and instructions stored in the memory and executable by the processor to cause the apparatus to perform the method of one or more of Aspects 1-44.

Aspect 78: A device for wireless communication, comprising a memory and one or more processors coupled to the memory, the one or more processors configured to perform the method of one or more of Aspects 1-44.

Aspect 79: An apparatus for wireless communication, comprising at least one means for performing the method of one or more of Aspects 1-44.

Aspect 80: A non-transitory computer-readable medium storing code for wireless communication, the code comprising instructions executable by a processor to perform the method of one or more of Aspects 1-44.

Aspect 81: A non-transitory computer-readable medium storing a set of instructions for wireless communication, the set of instructions comprising one or more instructions that, when executed by one or more processors of a device, cause the device to perform the method of one or more of Aspects 1-44.

Aspect 82: An apparatus for wireless communication at a device, comprising a processor; memory coupled with the processor; and instructions stored in the memory and executable by the processor to cause the apparatus to perform the method of one or more of Aspects 45-76.

Aspect 83: A device for wireless communication, comprising a memory and one or more processors coupled to the memory, the one or more processors configured to perform the method of one or more of Aspects 45-76.

Aspect 84: An apparatus for wireless communication, comprising at least one means for performing the method of one or more of Aspects 45-76.

Aspect 85: A non-transitory computer-readable medium storing code for wireless communication, the code comprising instructions executable by a processor to perform the method of one or more of Aspects 45-76.

Aspect 86: A non-transitory computer-readable medium storing a set of instructions for wireless communication, the set of instructions comprising one or more instructions that, when executed by one or more processors of a device, cause the device to perform the method of one or more of Aspects 45-76.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving a signal comprising a synchronization signal block (SSB);
   determining, based at least in part on a machine learning component, a predicted communication metric and a confidence indication, wherein the machine learning component comprising a machine learning model, and wherein determining the predicted communication metric and the confidence indication comprises:
   receiving, by the machine learning model, an input that comprises an input metric and an error measurement corresponding to the input metric;
   obtaining, by the machine learning model and based at least in part on a machine learning function associated with a set of reference signals and the error measurement, a set of measurements associated with a subset of the set of reference signals, wherein the subset includes fewer reference signals than the set of reference signals, wherein obtaining the set of measurements comprises skipping at least one configured measurement based at least in part on receiving a downlink communication during a measurement occasion corresponding to the at least one configured measurement;
   generating, by the machine learning model and based at least in part on the machine learning function, an interpolated measurement corresponding to a first input port, of the machine learning function, for which the measurement was not obtained;
   generating, by the machine learning model and based at least in part on the machine learning function, a measurement pattern indication, corresponding to the set of measurements, including:
   an indication of at least one of the first input port for which the measurement was not obtained, or a second input port of the machine learning function for which the measurement was obtained, and
   an indication of an interpolation error corresponding to the interpolated measurement;

providing, by the machine learning model and based at least in part on the machine learning function and the input, the predicted communication metric and the confidence indication; and performing a wireless communication task based at least in part on the predicted communication metric and the confidence indication.

2. The method of claim 1, wherein the input metric comprises a reference signal received power (RSRP), and wherein the predicted communication metric comprises a predicted RSRP.

3. The method of claim 1, wherein the confidence indication comprises a standard deviation associated with the predicted communication metric.

4. The method of claim 1, wherein the input metric comprises an interpolated metric value, the method further comprising:
   determining a plurality of interpolated metric values that include the interpolated metric value; and
   selecting the interpolated metric value based at least in part on the error measurement comprising a smallest error measurement of a plurality of error measurements corresponding to the plurality of interpolated metric values.

5. The method of claim 1, further comprising transmitting a model error report that indicates a model inference error associated with the predicted communication metric.

6. The method of claim 5, wherein transmitting the model error report comprises transmitting the model error report based at least in part on at least one analytic metric associated with the predicted communication metric satisfying a reporting condition.

7. The method of claim 1, further comprising receiving a machine learning configuration associated with the machine learning component.

8. The method of claim 1, wherein the machine learning function comprises:
   a first set of input ports, including the first input port and the second input port, associated with the set of reference signals;
   a second set of input ports associated with a set of error metrics, wherein the set of error metrics includes the error measurement;
   a first set of output ports associated with a set of predicted communication metrics, wherein the set of predicted communication metrics includes the predicted communication metric; and
   a second set of output ports associated with a set of confidence measurement outputs, wherein the set of confidence measurement outputs includes the confidence indication.

9. The method of claim 8, further comprising performing a pre-processing operation corresponding to the set of reference signals.

10. The method of claim 9, wherein performing the pre-processing operation comprises normalizing a set of input data based at least in part on a normalization metric.

11. The method of claim 10, further comprising receiving an indication of the normalization metric.

12. The method of claim 1, further comprising receiving a configuration associated with a measurement input format corresponding to the measurement pattern indication, wherein generating the measurement pattern indication comprises generating the measurement pattern indication based at least in part on the measurement input format.

13. The method of claim 1, wherein the measurement pattern indication indicates an interpolation error value of zero associated with the second input port for which the measurement was obtained.

14. The method of claim 1, wherein the input metric comprises a prior predicted communication metric.

15. The method of claim 14, wherein providing the predicted communication metric comprises performing an autoregression procedure associated with the prior predicted communication metric.

16. The method of claim 15, wherein the error measurement comprises at least one prior confidence indication associated with the prior predicted communication metric.

17. The method of claim 1, wherein providing the confidence indication comprises determining, using a dedicated output layer, a predicted standard deviation.

18. The method of claim 17, wherein generating the predicted standard deviation comprises generating the predicted standard deviation based at least in part on an activation function, wherein the activation function is based at least in part on at least one of a shifted exponential linear unit or an optimal epsilon value.

19. The method of claim 1, wherein providing the confidence indication comprises determining the confidence indication using a central processing unit and based at least in part on an output from a plurality of configured model layers.

20. The method of claim 1, further comprising transmitting a capability report that indicates a capability of the UE to provide the confidence indication, and wherein the capability report further indicates a supported activation type associated with an output layer of the machine learning model.

21. The method of claim 1, further comprising transmitting, using an over-the-air communication, an output report associated with the machine learning component, the output report indicating at least one of the predicted communication metric or the confidence indication.

22. A user equipment (UE) for wireless communication, comprising:
   one or more memories; and
   one or more processors, coupled to the one or more memories, configured to:
   receive a signal comprising a synchronization signal block (SSB);
   determine, based at least in part on a machine learning component, a predicted communication metric and a confidence indication, wherein the machine learning component comprising a machine learning model, and wherein, to determine the predicted communication metric and the confidence indication, the one or more processors are configured to:
   receive, by the machine learning model, an input that comprises an input metric and an error measurement corresponding to the input metric;
   obtain, by the machine learning model and based at least in part on a machine learning function associated with a set of reference signals and the error measurement, a set of measurements associated with a subset of the set of reference signals, wherein the subset includes fewer reference signals than the set of reference signals, wherein, to obtain the set of measurements, the one or more processors are configured to skip at least one configured measurement based at least in part on receiving a downlink communication during a measurement occasion corresponding to the at least one configured measurement;

generate, by the machine learning model and based at least in part on the machine learning function, an interpolated measurement corresponding to a first input port, of the machine learning function, for which the measurement was not obtained;

generate, by the machine learning model and based at least in part on the machine learning function, a measurement pattern indication, corresponding to the set of measurements, including:

an indication of at least one of the first input port for which the measurement was not obtained, or a second input port of the machine learning function for which the measurement was obtained, and an indication of an interpolation error corresponding to the interpolated measurement; and provide and based at least in part on a machine learning function and the input, the predicted communication metric and the confidence indication; and perform a wireless communication task based at least in part on the predicted communication metric and the confidence indication.

23. The UE of claim 22, wherein the input metric comprises a reference signal received power (RSRP), and wherein the predicted communication metric comprises a predicted RSRP.

24. The UE of claim 22, wherein the confidence indication comprises a standard deviation associated with the predicted communication metric.

25. The UE of claim 22, wherein the input metric comprises an interpolated metric value, the one or more processors further configured to:

determine a plurality of interpolated metric values that include the interpolated metric value; and select the interpolated metric value based at least in part on the error measurement comprising a smallest error measurement of a plurality of error measurements corresponding to the plurality of interpolated metric values.

26. The UE of claim 22, wherein the one or more processors are further configured to transmit a model error report that indicates a model inference error associated with the predicted communication metric.

27. An apparatus for wireless communication at a user equipment (UE), comprising:

one or more memories; and one or more processors, coupled to the one or more memories, configured to cause the UE to:

receive a signal comprising a synchronization signal block (SSB);

determine, based at least in part on a machine learning component, a predicted communication metric and a confidence indication, wherein the machine learning component comprising a machine learning model, and wherein, to determine the predicted communication metric and the confidence indication, the one or more processors are configured to:

receive an input that comprises an input metric and an error measurement corresponding to the input metric;

obtain, based at least in part on a machine learning function associated with a set of reference signals and the error measurement, a set of measurements associated with a subset of the set of reference signals, wherein the subset includes fewer reference signals than the set of reference signals, wherein obtaining the set of measurements comprises skipping at least one configured measurement based at least in part on receiving a downlink communication during a measurement occasion corresponding to the at least one configured measurement;

generate, based at least in part on the machine learning function, an interpolated measurement corresponding to a first input port, of the machine learning function, for which the measurement was not obtained;

generate, based at least in part on the machine learning function, a measurement pattern indication, corresponding to the set of measurements, including:

an indication of at least one of the first input port for which the measurement was not obtained, or a second input port of the machine learning function for which the measurement was obtained, and an indication of an interpolation error corresponding to the interpolated measurement;

provide, based at least in part on the machine learning function and the input, the predicted communication metric and the confidence indication; and perform a wireless communication task based at least in part on the predicted communication metric and the confidence indication.

28. The apparatus of claim 27, wherein the input metric comprises a reference signal received power (RSRP), and wherein the predicted communication metric comprises a predicted RSRP.

29. An apparatus for wireless communication, comprising:

means for receiving a signal comprising a synchronization signal block (SSB);

means for determining, based at least in part on a machine learning component, a predicted communication metric and a confidence indication, the machine learning component comprising a machine learning model, and wherein determining the predicted communication metric and the confidence indication comprises:

means for receiving an input that comprises an input metric and an error measurement corresponding to the input metric;

means for obtaining, based at least in part on a machine learning function associated with a set of reference signals and the error measurement, a set of measurements associated with a subset of the set of reference signals, wherein the subset includes fewer reference signals than the set of reference signals, wherein obtaining the set of measurements comprises skipping at least one configured measurement based at least in part on receiving a downlink communication during a measurement occasion corresponding to the at least one configured measurement;

means for generating, based at least in part on the machine learning function, an interpolated measurement corresponding to a first input port, of the machine learning function, for which the measurement was not obtained;

means for generating, based at least in part on the machine learning function, a measurement pattern indication, corresponding to the set of measurements, including:

an indication of at least one of the first input port for which the measurement was not obtained, or a second input port of the machine learning function for which the measurement was obtained, and an indication of an interpolation error corresponding to the interpolated measurement;

means for providing, based at least in part on the machine learning function and the input, the predicted communication metric and the confidence indication; and means for performing a wireless communication task based at least in part on the predicted communication metric and the confidence indication.

30. The apparatus of claim 29, wherein the input metric comprises a reference signal received power (RSRP), and wherein the predicted communication metric comprises a predicted RSRP.

* * * * *